(12) United States Patent  
Irie

(10) Patent No.: US 6,508,640 B1  
(45) Date of Patent: Jan. 21, 2003

(54) TIRE VULCANIZING SYSTEM AND TIRE VULCANIZING METHOD

(75) Inventor: Nobuhiko Irie, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/383,286

(22) Filed: Aug. 25, 1999

(51) Int. Cl.[7] .............................................. B29C 35/02
(52) U.S. Cl. ........................................ 425/34.1; 425/38
(58) Field of Search ........................... 425/34.1, 38, 47

(56) References Cited

U.S. PATENT DOCUMENTS

| | | | |
|---|---|---|---|
| 3,824,048 A | | 7/1974 | Getz |
| 5,589,200 A | * | 12/1996 | Irie .............................. 425/47 |
| 5,681,594 A | * | 10/1997 | Irie ........................... 425/34.1 |
| 5,723,154 A | * | 3/1998 | Irie ........................... 425/34.1 |
| 5,820,885 A | | 10/1998 | Irie |
| 5,853,526 A | | 12/1998 | Laurent et al. |

FOREIGN PATENT DOCUMENTS

| | | |
|---|---|---|
| DE | 12 04 814 B | 11/1965 |
| EP | 0 712 705 A2 | 5/1996 |
| EP | 0 754 530 A2 | 1/1997 |
| FR | 1 146 221 A | 11/1957 |
| FR | 2 194 558 A | 3/1974 |
| GB | 1136712 | 12/1968 |
| JP | 07080846 | 3/1995 |
| JP | 08047928 | 2/1996 |
| JP | 08192429 | 7/1996 |
| JP | 8-150623 | 11/1996 |
| JP | 09029746 | 2/1997 |
| JP | 10-146838 | 2/1998 |

\* cited by examiner

*Primary Examiner*—James P. Mackey  
(74) *Attorney, Agent, or Firm*—Alston & Bird LLP

(57) ABSTRACT

A tire vulcanizing system of the present invention comprises a plurality of rows of tire vulcanizing stations which contain a plurality of sets of movable tire mold assemblies to vulcanize a tire; a mold opening/closing station which is disposed at the tire vulcanizing stations to receive the tire mold assembly to open and close a tire mold, by which a vulcanized tire is removed and a green tire is inserted; and a first mold transporting device and a second mold transporting device which are disposed between the mold opening/closing station and the tire vulcanizing stations to transport the tire mold assembly.

16 Claims, 15 Drawing Sheets

TIRE VULCANIZING SYSTEM AND TIRE VULCANIZING METHOD

BACKGROUND OF THE INVENTION AND RELATED ART STATEMENT

1. Field of the Invention

The present invention relates to a tire vulcanizing system and a tire vulcanizing method, in which tire vulcanization, mold change, bladder change, mold preheating, and the like are carried out.

2. Description of Related Art

In a conventional fully automatic tire vulcanizing press, the work time for loading a green tire, shaping, and unloading a vulcanized tire is far shorter than the time over which vulcanization is carried out by introducing a heating/pressurizing medium in a tire in a state in which a tire mold assembly is closed. Therefore, a tire mold opening/closing device for opening/closing the tire mold assembly to load/unload a tire and tire loading and unloading devices are low in operation efficiency.

To solve this problem, the applicant of this invention has already proposed a tire vulcanizing system disclosed in Japanese Patent Provisional Publication No. 7-80846 (No. 80846/1995).

As shown in FIGS. 16 and 17, this tire vulcanizing system comprises vulcanizing stations 501a and 501b, mold opening/closing stations 502a and 502b, tire mold transporters 503a and 503b, rails 504 for the tire mold transporters, mold beds 505a, 505b, ..., an unloader 507a, a loader 508a, a conveyor 509a for conveying vulcanized tires, a rack 510a for green tires, and a mold changing station (for changing a tread mold, side wall mold, etc. in a tire mold assembly Ma to accommodate a change of specification of a tire to be vulcanized and for changing a bladder, which is an expendable) 511.

In such a tire vulcanization system, a tire mold assembly Mc for which vulcanization has been finished is received by the tire mold transporter 503a (or 503b) from the vulcanizing station 501a (or 501b) at which a plurality of tire mold assemblies Mc being vulcanized are arranged, and is transported to the mold opening/closing station 502a (or 502b).

After the tire mold assembly Mc having been transported to the mold opening/closing station 502a is connected to the tire mold opening/closing device 506a (or 506b), the tire mold assembly Mc is opened by the tire mold opening/closing device 506a, and a vulcanized tire is unloaded by the unloader 507a attached to the tire mold opening/closing device 506a. Then, a green tire is loaded by using the loader 508a attached to the tire mold opening/closing device 506a. After the loaded tire is shaped during a tire mold closing step and the tire mold assembly Mc is closed, a heating/pressurizing medium is introduced and sealed in the tire, by which a tire vulcanizing step is started.

Next, the tire mold assembly Mc in which vulcanization has been started is disconnected from the tire mold opening/closing device 506a, placed on the tire mold transporter 503a again and transported, and returned to the vulcanizing station 501a, 501b ...

In the above-described conventional tire vulcanizing system, a discharge device (a control valve and pipes) for discharging the heating/pressurizing medium in the bladder is provided at each vulcanizing station to shorten the operation time at the mold opening/closing station. Therefore, this system is undesirable from the economical viewpoint. In particular, this system is disadvantageous in terms of economy when this system, in which the control valve and pipes for vulcanization control are provided individually, is used for a facility for mass-producing tires having the equal vulcanization time.

Also, when the conventional tire vulcanizing system is used for a production facility for small tires such as tires for a passenger car, for which the vulcanization time is as short as 8 to 12 minutes, this system requires the following.

In this system, the time for which the mold transporting device receives a tire mold assembly at the vulcanizing station, the work at the mold opening/closing station is finished, and the closed tire mold assembly is transported again and returned to the vulcanization station must be as short as possible. The reason for this is that since the same mold transporting device is used for both ways, the time interval until the transportation of the next mold increases when the mold transporting device transports the mold assembly, so that there arise problems in that the number of molds constituting the tire vulcanizing system cannot be increased, and that the economical efficiency is decreased.

OBJECT AND SUMMARY OF THE INVENTION

The present invention has been made in view of the above situation, and accordingly an object thereof is to provide more economical tire vulcanizing system and tire vulcanizing method in which a discharge device is not disposed at each vulcanizing station, but is disposed at a position just before the mold loading side of a mold opening/closing station so as to be commonly used for a loaded mold assembly.

Also, another object of the present invention is to provide more economical tire vulcanizing system and tire vulcanizing method in which a vulcanization control valve etc. is not disposed at each vulcanizing station, and a heating/pressurizing medium supply station is disposed on the mold unloading side of the mold opening/closing station so as to be commonly used for the supply of a heating/pressurizing medium into a bladder of a mold assembly unloaded from the mold opening/closing station and for the supply of a heating medium into a heating chamber outside the mold.

Further, still another object of the present invention is to provide a more economical tire vulcanizing system in which a first transporter for transporting the tire mold assembly from a mold opening/closing device to a vulcanizing station and a second transporter for transporting the tire mold assembly from the vulcanizing station to the mold opening/closing device, by which the transportation time is shortened and the number of tire molds constituting the system is increased.

For example, assuming that the vulcanization time is 10 minutes, the transporter reciprocating time is 40 seconds, and the treatment time at the mold opening/closing station is 80 seconds, in the case of the conventional system disclosed in Japanese Patent Provisional Publication No. 7-80846 (No. 80846/1995), the number of molds which can be treated by one mold opening/closing station is $N1=10\times60/(40+80)=5\ldots 5$ molds.

By contrast, in the case of the system in accordance with the present invention, the number of molds which can be treated by one mold opening/closing station is $N2=10\times60/80=7.5\ldots 7$ molds, and the number of molds which can be treated by first and second mold transporters is $N3=10\times60/40=15\ldots 15$ molds.

As the whole of the system, the number of molds which can be treated is 7 molds at a maximum. In the system in accordance with the present invention, the number of molds can be increased as compared with the conventional system disclosed in Japanese Patent Provisional Publication No. 7-80846.

It can be found that in order to further increase the number of molds, the treatment capacity of the mold opening/closing station should be increased, as is apparent from the above calculation example. As one solution to this problem, two mold opening/closing stations have only to be arranged. However, this solution is undesirable in terms of economy.

Thereupon, the applicant of the present invention proposes a vulcanizing system in which part of the operation process at the mold opening/closing station is carried out outside the mold opening/closing station, by which the treatment capacity of the mold opening/closing station is increased.

Specifically, attention was paid to the fact that the treatment time of 80 seconds at the mold opening/closing station is composed of the following time:

a) time for opening and closing the mold
  about 30 sec
b) operation time of a vulcanized tire removing device
  about 10 sec
c) bladder operating time for peeling a bladder off a vulcanized tire
  about 10 sec
d) operation time of a green tire supply device
  about 10 sec
e) time for inserting a bladder into a green tire and shaping it
  about 20 sec Thereby, the treatment capacity of the mold opening/closing station has been increased by eliminating about 30 seconds (time of the above items c and e) by the following means: A vulcanized tire, together with a bladder assembly, is separated from a mold and is moved to the outside of the mold opening/closing station. At this place, a bladder is peeled off the vulcanized tire. A bladder is inserted into a green tire and is shaped in another bladder assembly and tire in advance, and this is supplied to the mold immediately after the vulcanized tire and bladder assembly are separated from the mold.

According to this method, trial calculation can be made as follows with the vulcanization time being 10 minutes in the same way as the above-described calculation example.

The number of molds which can be treated by one mold opening/closing station N=10×60/(80−30)=12 12 molds.

The number of molds which can be treated by first and second mold transporters N=10×60/40=15 15 molds.

As the whole of the system, the number of molds which can be treated is 12 molds at a maximum. Therefore, more economical tire vulcanizing system and tire vulcanizing method can be provided.

To solve the above-described problems with the conventional art, the tire vulcanizing system in accordance with the present invention comprises a plurality of rows of tire vulcanizing stations which contain a plurality of sets of movable tire mold assemblies to vulcanize a tire; a mold opening/closing station which is disposed at the tire vulcanizing stations to receive the tire mold assembly to open and close a tire mold, by which a vulcanized tire is removed and a green tire is inserted; and a first mold transporting device and a second mold transporting device which are disposed between the mold opening/closing station and the tire vulcanizing stations to transport the tire mold assembly.

Also, the tire vulcanizing system in accordance with the present invention comprises a plurality of rows of tire vulcanizing stations which contain a plurality of sets of movable tire mold assemblies to vulcanize a tire; a mold opening/closing station which is disposed at the tire vulcanizing stations to receive the tire mold assembly to open and close a tire mold, by which a vulcanized tire is removed and a green tire is inserted; and a first mold transporting device and a second mold transporting device which are disposed between the mold opening/closing station and the tire vulcanizing stations to transport the tire mold assembly, and further comprises a discharge station which is disposed on the mold loading side of the mold opening/closing station to discharge a heating/pressurizing medium in a bladder assembly of the tire mold assembly having been transported from the tire vulcanizing station; and a supply station which is disposed on the mold unloading side of the mold opening/closing station to supply the heating/pressurizing medium into a heating chamber and the bladder assembly of the tire mold assembly.

Further, the present invention provides a tire vulcanizing system in which a movable tire mold assembly is carried onto a mold opening/closing station, where a tire mold is opened and closed to remove a vulcanized tire and insert a green tire for the vulcanization of tire, characterized in that the system has a bladder assembly comprising an outer shaft to which a holding member for holding one end of bladder is fixed; an inner shaft to which a holding member for holding the other end of bladder is fixed, and which is inserted so as to be slidable in the axial direction with respect to the outer shaft; and rotating means, in which a retaining claw is formed at one end of the outer shaft, and a clawed flange having a claw which engages with or passes through the retaining claw of the outer shaft in accordance with the rotational angle is rotatably assembled to the inner shaft, for rotating the clawed flange from one end of the inner shaft, and by the engagement of the retaining claw of the outer shaft with the claw of the clawed flange, the vulcanized tire or the green tire and the bladder assembly are integrated for the insertion into and removal from the tire mold.

The present invention provides a tire vulcanizing system in which a movable tire mold assembly is carried onto a mold opening/closing station, where a tire mold is opened and closed to remove a vulcanized tire and insert a green tire for the vulcanization of tire, characterized in that the system is provided with a vulcanized tire removal and green tire supply device comprising a separation station which receives an assembly in which the vulcanized tire and a bladder assembly are integrated, and separates the vulcanized tire and the bladder assembly from each other; a storage station which stores the plurality of bladder assemblies from which the vulcanized tire has been separated; and a shaping station which receives the bladder assembly delivered from the storage station, inserts a bladder in the green tire and performs shaping, and integrates the green tire and the bladder assembly with each other.

Also, the present invention provides a tire vulcanizing method in which a movable tire mold assembly is carried onto a mold opening/closing station, where a tire mold is opened and closed to remove a vulcanized tire and insert a green tire for the vulcanization of tire, characterized in that a heating/pressurizing medium in a tire in the tire mold assembly is discharged at a waiting position just before the tire mold assembly is loaded to a mold opening/closing device at the mold opening/closing station, the tire mold is then opened and closed to remove the vulcanized tire and to insert the green tire, and the heating/pressurizing medium is supplied into the tire in the tire mold assembly and a heating medium is supplied to a heating chamber of the tire mold assembly at a waiting position on the unloading side of the tire mold assembly from the mold opening/closing device to vulcanize the tire.

Further, the present invention provides a tire vulcanizing method in which a movable tire mold assembly is carried onto a mold opening/closing station, where a tire mold is opened and closed to remove a vulcanized tire and insert a green tire for the vulcanization of tire, characterized in that when the vulcanized tire is removed by opening the tire mold, the vulcanized tire and a bladder assembly are removed as a unit, and then the vulcanized tire is peeled off the bladder assembly, and subsequently the green tire and the bladder assembly are inserted into the tire mold in an integrated state to vulcanize the tire.

As described above, the tire vulcanizing system in accordance with the present invention comprises a plurality of rows of tire vulcanizing stations which contain a plurality of sets of movable tire mold assemblies to vulcanize a tire; a mold opening/closing station which is disposed at the tire vulcanizing stations to receive the tire mold assembly to open and close a tire mold, by which a vulcanized tire is removed and a green tire is inserted; and a first mold transporting device and a second mold transporting device which are disposed between the mold opening/closing station and the tire vulcanizing stations to transport the tire mold assembly. Therefore, the transportation work of the tire mold assembly between the vulcanizing station and the mold opening/closing station can be performed independently at the same time, so that the productivity of the whole system can be enhanced by shortening the transportation time, and the number of tire molds constituting the vulcanizing system can be increased.

Also, the tire vulcanizing system in accordance with the present invention comprises a plurality of rows of tire vulcanizing stations which contain a plurality of sets of movable tire mold assemblies to vulcanize a tire; a mold opening/closing station which is disposed at the tire vulcanizing stations to receive the tire mold assembly to open and close a tire mold, by which a vulcanized tire is removed and a green tire is inserted; and a first mold transporting device and a second mold transporting device which are disposed between the mold opening/closing station and the tire vulcanizing stations to transport the tire mold assembly, and further comprises a discharge station which is disposed on the mold loading side of the mold opening/closing station to discharge a heating/pressurizing medium in a bladder assembly of the tire mold assembly having been transported from the tire vulcanizing station; and a supply station which is disposed on the mold unloading side of the mold opening/closing station to supply the heating/pressurizing medium into a heating chamber and the bladder assembly of the tire mold assembly. Therefore, the same effects as those of the above-described invention can be achieved, and also the heating/pressurizing medium discharge and supply stations can be commonly used for the loaded tire mold assembly.

Further, the present invention provides a tire vulcanizing system in which a movable tire mold assembly is carried onto a mold opening/closing station, where a tire mold is opened and closed to remove a vulcanized tire and insert a green tire for the vulcanization of tire, characterized in that the system has a bladder assembly comprising an outer shaft to which a holding member for holding one end of bladder is fixed; an inner shaft to which a holding member for holding the other end of bladder is fixed, and which is inserted so as to be slidable in the axial direction with respect to the outer shaft; and rotating means, in which a retaining claw is formed at one end of the outer shaft, and a clawed flange having a claw which engages with or passes through the retaining claw of the outer shaft in accordance with the rotational angle is rotatably assembled to the inner shaft, for rotating the clawed flange from one end of the inner shaft, and by the engagement of the retaining claw of the outer shaft with the claw of the clawed flange, the vulcanized tire or the green tire and the bladder assembly are integrated for the insertion into and removal from the tire mold. Therefore, the removal of the vulcanized tire and the insertion of the green tire can be carried out rapidly and securely.

The present invention provides a tire vulcanizing system in which a movable tire mold assembly is carried onto a mold opening/closing station, where a tire mold is opened and closed to remove a vulcanized tire and insert a green tire for the vulcanization of tire, characterized in that the system is provided with a vulcanized tire removal and green tire supply device comprising a separation station which receives an assembly in which the vulcanized tire and a bladder assembly are integrated, and separates the vulcanized tire and the bladder assembly from each other; a storage station which stores the plurality of bladder assemblies from which the vulcanized tire has been separated; and a shaping station which receives the bladder assembly delivered from the storage station, inserts a bladder in the green tire and performs shaping, and integrates the green tire and the bladder assembly with each other. Therefore, the vulcanized tire removing work and the green tire supplying work can be performed efficiently.

Also, the present invention provides a tire vulcanizing method in which a movable tire mold assembly is carried onto a mold opening/closing station, where a tire mold is opened and closed to remove a vulcanized tire and insert a green tire for the vulcanization of tire, characterized in that a heating/pressurizing medium in a tire in the tire mold assembly is discharged at a waiting position just before the tire mold assembly is loaded to a mold opening/closing device at the mold opening/closing station, the tire mold is then opened and closed to remove the vulcanized tire and to insert the green tire, and the heating/pressurizing medium is supplied into the tire in the tire mold assembly and a heating medium is supplied to a heating chamber of the tire mold assembly at a waiting position on the unloading side of the tire mold assembly from the mold opening/closing device to vulcanize the tire. Therefore, the vulcanization of tire can be carried out more rapidly and economically.

Further, the present invention provides a tire vulcanizing method in which a movable tire mold assembly is carried onto a mold opening/closing station, where a tire mold is opened and closed to remove a vulcanized tire and insert a green tire for the vulcanization of tire, characterized in that when the vulcanized tire is removed by opening the tire mold, the vulcanized tire and a bladder assembly are removed as a unit, and then the vulcanized tire is peeled off the bladder assembly, and subsequently the green tire and the bladder assembly are inserted into the tire mold in an integrated state to vulcanize the tire. Therefore, the vulcanization of tire can be carried out more rapidly and economically.

DETAILED DESCRIPTION OF PREFERRED EMBODIMENTS

Figure 1:
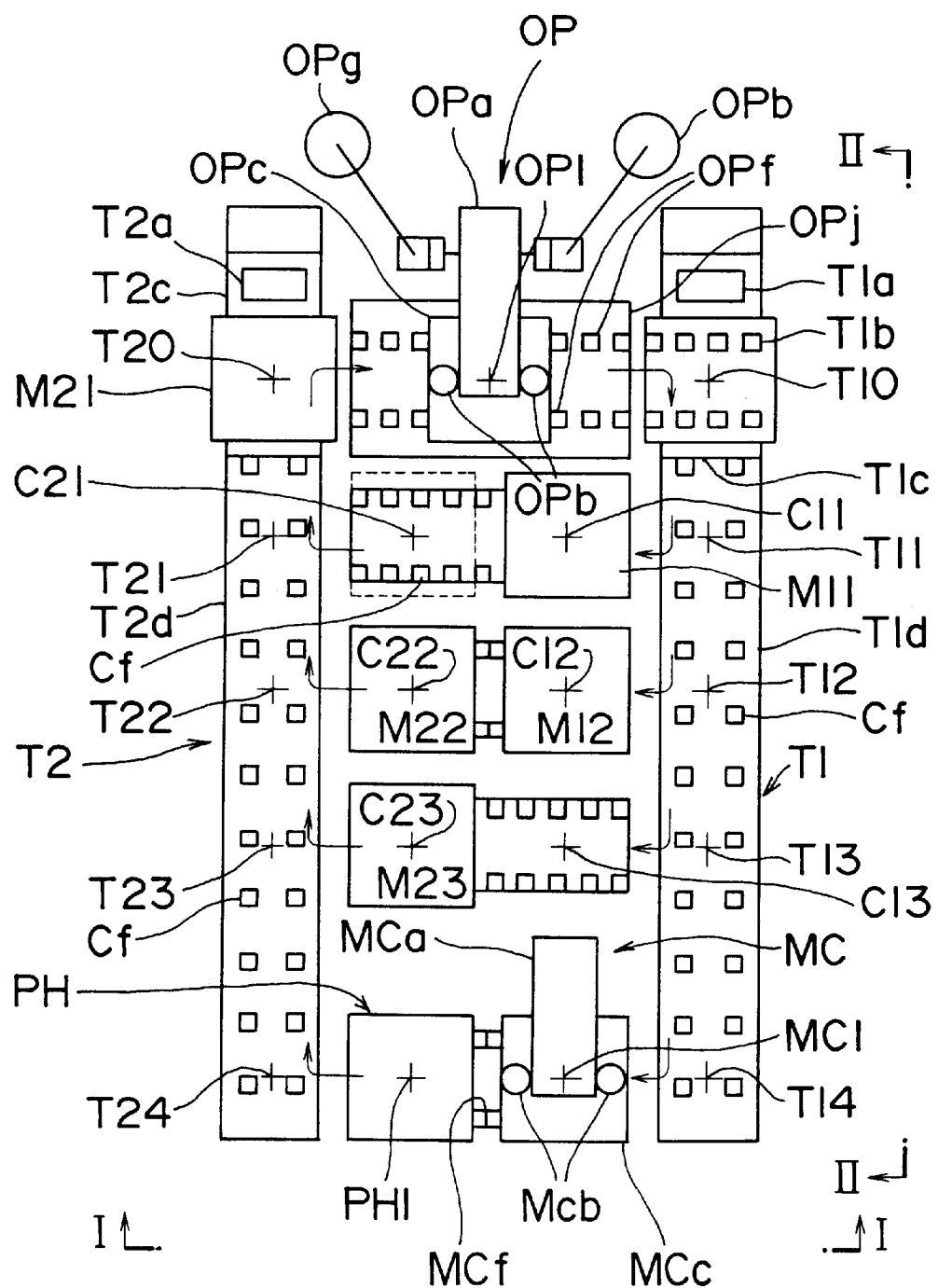
FIG. 1 is a plan view of a tire vulcanizing system in accordance with a first embodiment of the present invention.
Figure 2:
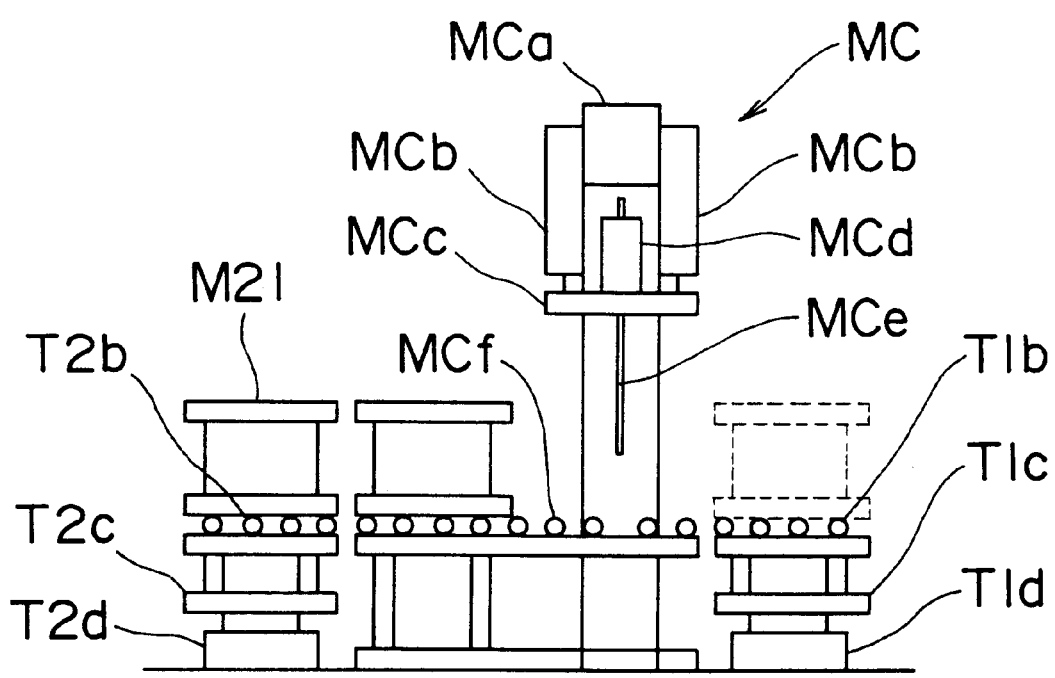
FIG. 2 is a view taken in the direction of the arrows along the line I—I of FIG. 1.
Figure 3:
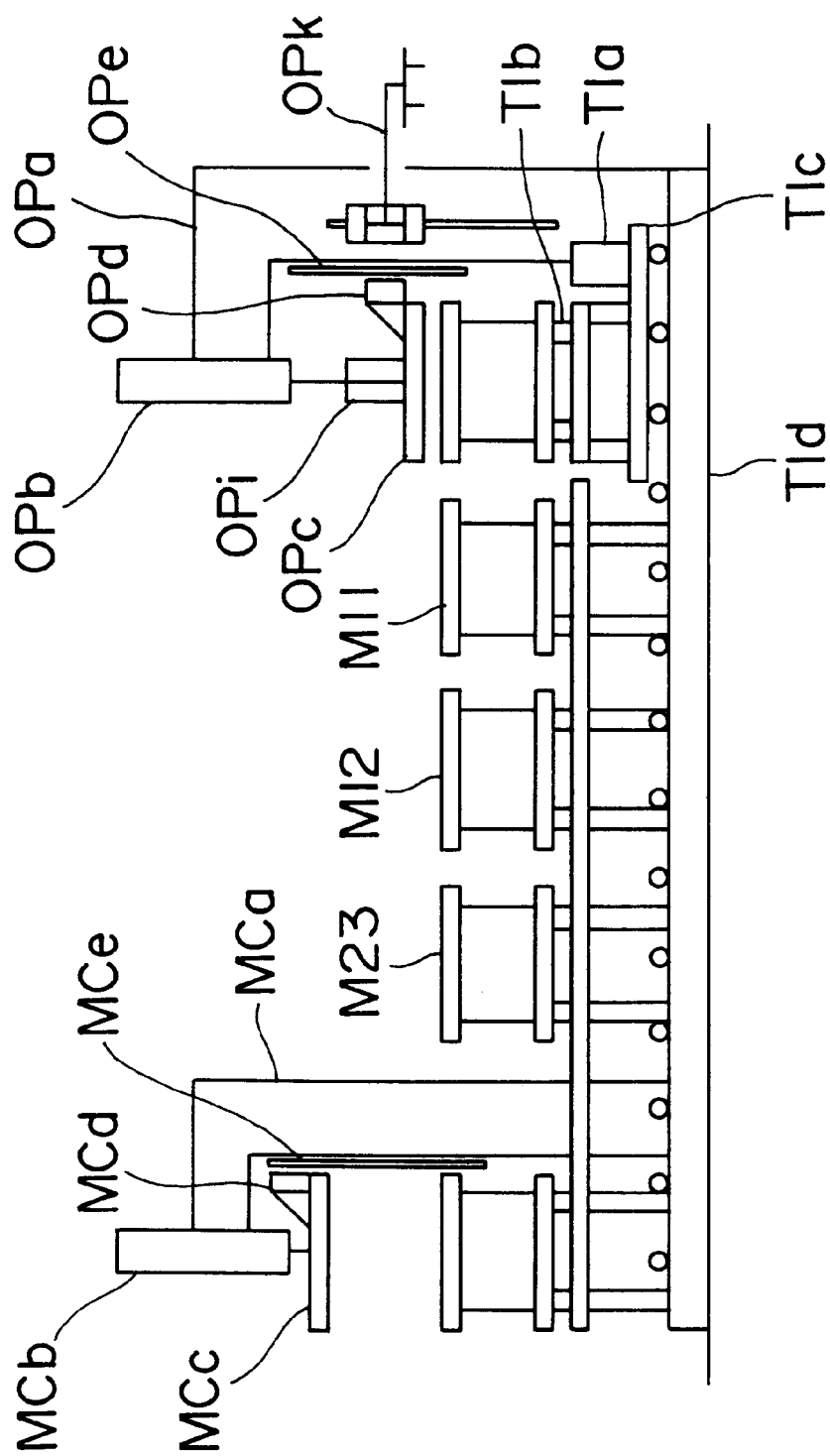
FIG. 3 is a view taken in the direction of the arrows along the line II—II of FIG. 1.

Embodiments of the present invention will be described in detail with reference to the accompanying drawings. FIG. 1 is a plan view of a tire vulcanizing system in accordance with a first embodiment of the present invention, FIG. 2 is a view taken in the direction of the arrows along the line I—I of FIG. 1, and FIG. 3 is a view taken in the direction of the arrows along the line II—II of FIG. 1.

As shown in FIG. 1, the tire vulcanizing system in accordance with the first embodiment comprises a plurality of rows of tire vulcanizing stations C11 to C23 which contain a plurality of sets of movable tire mold assemblies M (M11 to M23) and vulcanize tires, a mold opening/closing station OP1 which is disposed at these vulcanizing station C11 to C23 to receive the tire mold assembly M to remove a vulcanized tire and insert a green tire by opening/closing the tire mold, and a first tire mold transporting device T1 and a second tire mold transporting device T2 which are disposed between the mold opening/closing station OP1 and the vulcanizing stations C11 to C23 to transport the tire mold assembly M.

A first row of vulcanizing stations C11, C12 and C13 are arranged so that their centers are on a straight line, and a second row of vulcanizing stations C21, C22 and C23 are arranged in parallel with the first row. Although a total of six vulcanizing stations are arranged in this embodiment shown in FIG. 1, the number of vulcanizing stations may be increased, for example, by adding a third row.

The vulcanizing stations C11 to c23 each have a plurality of sets of travel guide rollers Cf provided on a base (not shown) of the vulcanizing station. The tire mold assemblies M11, M12, M13, M21, M22 and M23 are arranged so as to be capable of being moved in the movement direction (for example, in the direction from the vulcanizing station C11 to C21) by means of these travel guide rollers Cf.

Also, on the base of each of the vulcanizing stations C11 to C23, a positioning device (not shown) for positioning the mold assembly M having been moved is provided. By using this positioning device, the tire mold assembly M is fixed to a predetermined position, or it is released from its fixation. In addition, on the base of each of the vulcanizing stations C11 to C23, an internal pressure supply device and an external pressure supply device (if necessary, refer to Japanese Patent Provisional Publication No. 7-80846 (No. 80846/1995) published by the inventor of this invention), which are well-known and not shown in the figure, are provided.

On one end side of the rows of the vulcanizing stations C11 to C23, a mold opening/closing device OP is provided.

As shown in FIGS. 1 and 3, the mold opening/closing device OP comprises a frame OPa erected on a base OPj, a well-known loader OPg for loading a green tire which is capable of being moved vertically on a side surface of the frame OPa and swung between the center position of the mold opening/closing device (mold opening/closing station) OPl and the waiting position, a well-known unloader OPh for unloading a vulcanized tire which is similar to the loader OPg and is disposed on the side surface of the frame OPa on the side opposite to the loader OPg, an elevation guide rail OPe provided on a side surface of the frame OPa other than the side surfaces on which the loader OPa and the unloader OPh are mounted, a guide bracket OPd sliding on the elevation guide rail OPe, an upper movable plate OPc fixed to the guide bracket OPd, a well-known split mold opening/closing operation device OPi provided at the center of the upper movable plate OPc, and a plurality of sets of elevating cylinders OPb one end of which is fixed to the frame OPa and the other end of which is fixed to the upper movable plate OPc.

On the upper surface of the base OPj are provided guide rollers OPf and a positioning device (not shown) for positioning the tire mold assembly M having been moved, which are similar to those at the vulcanization stations C11 to C23.

Also, at the central portion of the base OPj, that is, at the mold opening/closing station OPl, an operating device (not shown) for a bladder assembly (not shown) incorporated in the tire mold assembly M and an internal pressure supply device (not shown) for supplying a heating/pressurizing medium to the bladder assembly are provided. For the bladder assembly, the operating device for the bladder assembly, and the internal pressure supply device, which are not shown in the figures, Japanese Patent Provisional Publication No. 8-80846 (No. 80846/1995) published by the inventor of this invention should be referred to.

On the other end side of the vulcanizing stations C11 to C23 (on the opposite side of the mold opening/closing device OP), a mold changing device MC and a mold preheating device PH are provided.

The mold changing device MC has a structure similar to that of the mold opening/closing device OP, but it differs from the mold opening/closing device OP in that the loader OPg for loading a green tire, the unloader OPh for unloading a vulcanized tire, and the split mold opening/closing operation device OPi are not provided. That is to say, as shown in FIG. 2, the mold changing device MC comprises a frame MCa, an elevating cylinder MCb, an upper movable plate MCc, a guide bracket MCd, an elevation guide rail MCe, a travel guide rollers MCf, and the like.

The mold preheating device PH comprises a base, travel guide rollers, an external pressure supply device, and a positioning device, like the vulcanizing station C11 to C23.

On each side of the vulcanizing stations C11 to C23, the mold opening/closing device OP, the mold changing device MC, and the mold preheating device PH, the first tire mold transporting device T1 and the second tire mold transporting device T2 are provided.

The first tire mold transporting device T1 (T1$a$, T1$b$, ...) can move between a stop position T10 at the front of the mold opening/closing device OP, stop positions T11, T12 and T13 at the front of the vulcanizing stations C11, C12 and C13, respectively, and a stop position T14 at the front of the mold changing device MC, and can stop as necessary.

Also, the second tire mold transporting device T2 (T2$a$, T2$b$, ...) can move between a stop position T20 at the front of the mold opening/closing device OP, stop positions T21, T22 and T23 at the front of the vulcanizing stations C21, C22 and C23, respectively, and a stop position T24 at the front of the mold preheating device PH, and can stop as necessary.

The first tire mold transporting device T1 and the second tire mold transporting device T2 have the same configuration. Therefore, only the first tire mold transporting device T1 will be described.

The first tire mold transporting device T1 is provided with a base T1$d$ along the vulcanizing stations C11, C12 and C13, and a plurality of sets of guide rollers Cf are provided on the base T1$d$. On these guide rollers Cf is provided a first tire mold transporter T1$c$, which can be moved along the vulcanizing stations C11, C12 and C13 by using a well-known driving unit T1$a$. On the top surface of the first tire mold transporter T1$c$ are provided a plurality of sets of guide rollers T1$b$.

The top level of the guide rollers T1$b$ is set so as to have a height equal to that of the guide rollers OPf of the mold opening/closing device OP, the guide rollers Cf of the vulcanizing stations C11, C12 and C13, and the guide rollers MCf of the mold changing device MC.

Further, the first tire mold transporter T1$c$ is provided with a mold transfer device (not shown) which is used for transferring the mold assembly between the first tire mold transporter T1$c$ and the mold opening/closing device OP or between the first tire mold transporter T1$c$ and the vulcanizing stations C11, C12 and C13. For this not illustrated mold transfer device, Japanese Patent Provisional Publication No. 8-192429 (No. 192429/1996) published by the inventor of this invention should be referred to. Also, for the details of the tire assembly, Japanese Patent Provisional Publication No. 8-47928 (No. 47928/1996) and Japanese Patent Provisional Publication No. 9-29746 (No. 29746/1997) published by the inventor of this invention should be referred to.

Although the vulcanizing stations C11 to C23 of the first embodiment shown in FIG. 1 are arranged in two rows, the present invention is not limited to this configuration, and the vulcanizing stations C11 to C23 may be arranged in three rows, four rows, and so on. Also, the mold opening/closing device OP may be disposed at the intermediate portion of the vulcanizing stations.

Next, the operation of the tire vulcanizing system in accordance with the first embodiment of the present invention will be described.

(1) When the completion of tire vulcanization in the tire mold assembly at the vulcanizing station C21 is near at hand, a second tire mold transporter T2$c$ moves to the stop position T21 at the front of the vulcanizing station C21, and stops there.

(2) The internal pressure supply device and the external pressure supply device (both are not shown) are disconnected at the vulcanizing station C21. On the other hand, a mold receiving arm (not shown) on a table of the second tire mold transporter T2$c$ is extended toward the vulcanizing station C21 and connected to a lower part of the tire mold assembly M21.

(3) The mold receiving arm is withdrawn, so that the tire mold assembly M21 slides on the guide rollers Cf of the vulcanizing station C21, and then transfers onto the guide rollers T2$b$ on the second tire mold transporter T2$c$ and slides on them. When the tire mold assembly M21 comes to a predetermined position, it stops there.

(4) When the tire mold assembly M21 stops, the lower part of the tire mold assembly M21 is fixed to the second tire mold transporter T2$c$. On the other hand, the second tire mold transporter T2$c$ moves to the stop position T20 at the front of the mold opening/closing device OP and stops there.

(5) After the second tire mold transporter T2$c$ stops, the mold receiving arm of the second tire mold transporter T2$c$ is extended toward the center of the mold opening/closing device OP. Then, the mold receiving arm is disconnected from the lower part of the tire mold assembly M21, and is withdrawn toward the second tire mold transporter T2$c$.

Thereafter, the second tire mold transporter T2$c$ moves to a stop position (T21, T22 or T23) at the front of the vulcanizing station at which the next vulcanization is to be finished, and waits there.

(6) The upper movable plate OPc of the mold opening/closing device OP (OPa, OPb ...) waits at a position slightly higher than the tire mold assembly M21 in such a manner as not to obstruct the movement of the tire mold assembly M21 to be moved to under the upper movable plate OPc.

(7) When the tire mold assembly M21 stops, the lower part of the tire mold assembly M21 is fixed. On the other hand, the upper movable plate OPc lowers and is connected to an upper part of the tire mold assembly M21.

(8) Next, the upper movable plate OPc starts to rise, and at the same time, the split mold device (not shown) at the center of the upper movable plate OPc operates so that an upper mold starts to open. When the upper movable plate OPc continues to rise, the upper mold is opened fully and reaches the upper limit position.

A vulcanized tire remains on a lower mold, and the bladder assembly (not shown) provided at the center of the tire mold assembly M21 is operated by a bladder driving device (not shown) provided at the center of the lower part of the mold opening/closing device OP, so that a bladder is peeled from the inside of the tire.

(9) At an appropriate time, the unloader OPh advances and lowers, holds an upper bead portion of the vulcanized tire on the lower mold, and then rises and discharges the vulcanized tire. This discharged vulcanized tire is conveyed to the next process by using a discharge conveyor (not shown).

(10) On the other hand, the loader OPg advances and lowers at an appropriate time while holding a green tire, and puts the green tire on the lower mold. Then, the bladder driving device is operated to insert a bladder into the green tire.

(11) At an appropriate time, the loader OPg releases the green tire, and rises and retreats. Then, the upper movable plate OPc lowers so that the opened upper mold moves to the closing position.

(12) After the upper mold is closed, the upper movable plate OPc is disconnected from the upper mold, and rises to a height such as to permit the passage of the tire mold assembly M21. On the other hand, the lower part of the mold assembly M21 is released.

During the operation of the mold opening/closing device OP, the first tire mold transporter T1c waits at the stop position T10 on the exit side of the mold opening/closing device OP.

(13) A mold receiving arm is extended from the first tire mold transporter T1c, and is connected to the lower part of the tire mold assembly M21.

Then, the arm is withdrawn. The tire mold assembly M21 slides on the guide rollers OPf of the tire mold opening/closing device OP, and then transfers onto the guide rollers T1b on the first tire mold transporter T1c and slides on them. When the tire mold assembly M21 comes to a predetermined position, it stops there.

(14) The lower part of the tire mold assembly M21 is fixed to the first tire mold transporter T1c, and the first tire mold transporter T1c moves along the vulcanizing stations and stops.

The stop position is the stop position T11 at the front of the tire mold assembly M11 arranged abreast of the tire mold assembly M21 having been moved in items (1), (2) and (3) of the description of operation.

After the tire mold assembly M21 is received by the second tire mold transporter T2c, the tire mold assembly M11 in which vulcanization is being performed is moved from the adjacent vulcanizing station C11 to the vulcanizing station C21 having become empty. Therefore, the vulcanizing station C11 on the side of the first tire mold transporter T1c is empty, so that it can receive the tire mold assembly M21 for which the predetermined work has been finished by the mold opening/closing device OP.

(15) When the first tire mold transporter T1c stops at the stop position T11 at the front of the vulcanizing station C11, the tire mold assembly M21 is released. Then, the arm of the first tire mold transporter T1c is extended, so that the tire mold assembly M21 slides on the guide rollers T1b on the transporter, and then transfers onto the guide rollers Cf of the vulcanizing station C11 and slides on them, and stops.

(16) After the tire mold assembly M21 stops, the arm is withdrawn toward the transporter, and the transporter moves to the position of the mold opening/closing device and stops for waiting.

On the other hand, the tire mold assembly M21 stopping at the vulcanizing station is connected with the internal pressure supply device and the external pressure supply device, and a heating/pressurizing medium is supplied to continue the vulcanization of tire.

When tires are manufactured, as shown in the above description of operation, the tire mold assembly M in which vulcanization has been finished is transported from the exit side of the vulcanizing station (C11 to C23) to the mold opening/closing device by using the second tire mold transporter T2c. After the predetermined work is finished, the tire mold assembly M is returned to the entrance side of the vulcanizing station by using the first tire mold transporting device, thereby continuing the vulcanization.

When a tire mold device incorporated in the tire mold assembly M is changed during the production, the changing operation is performed by the following procedure.

(1) For the tire mold assembly M in which the final vulcanization has been finished, after a vulcanized tire is removed by the procedure in items (1) to (9) in the above description of operation, the mold is closed without a green tire being inserted.

(2) Subsequently, after the operation in items (12) and (13) is finished, the first tire mold transporter T1c moves along the vulcanizing stations, and stops at the stop position T14 at the front of the mold changing device MC.

(3) When the first tire mold transporter T1c stops, the tire mold assembly M is released. Then, the arm of the first tire mold transporter T1c is extended, so that the tire mold assembly M slides on the guide rollers T1b on the transporter, transfers onto the guide rollers MCf of the mold changing device MC and slides on them, and stops at a center position MC1 of the mold changing device MC.

(4) After the tire mold assembly M stops, the arm is disconnected from the lower part of the tire mold assembly M and withdrawn toward the transporter. Then, the tire mold transporter T1c moves and stops at the stop position T10 at the front of the mold opening/closing device OP for waiting.

(5) When the tire mold assembly M stops, the lower part of the tire mold assembly M is fixed.

(6) A worker engaging in the mold changing work removes connecting bolts for connecting the tire mold device to upper and lower plates of the tire mold assembly M like the work on the conventional vulcanizer.

(7) Thereafter, an upper plate of the mold changing device MC lowers and is connected to the upper plate of the tire mold assembly M. When the upper plate is raised, the tire mold device is left on the lower side.

(8) The worker takes out the used tire mold device by using a forklift or the like equipment, and loads and sets a new tire mold device prepared in advance.

(9) The upper movable plate MCc lowers and puts the upper plate of the mold assembly M on the new tire mold device. After the upper movable plate MCc rises, the worker installs the bolts having been removed in item (6).

(10) Subsequently, the tire mold assembly M moves to a position of the adjacent mold preheating device PH, and stops. After stopping, the tire mold assembly M is connected with the external pressure supply device to supply a heating medium, by which the heating of the tire mold is started.

(11) The mold assembly M heated to a predetermined temperature is transported to the mold opening/closing device OP by using the second tire mold transporter T2c at an appropriate time, and the mold is opened. Then, a green tire is supplied, by which the tire production is started.

If the number of tire mold assemblies is set so that extra one for preheating is added to the number of vulcanizing stations (six in the example shown in the figures), the tire mold assembly to be changed can be prepared during the tire production, and after the used mold assembly has been carried out, the tire production can be started immediately by using a new mold.

Figure 4:
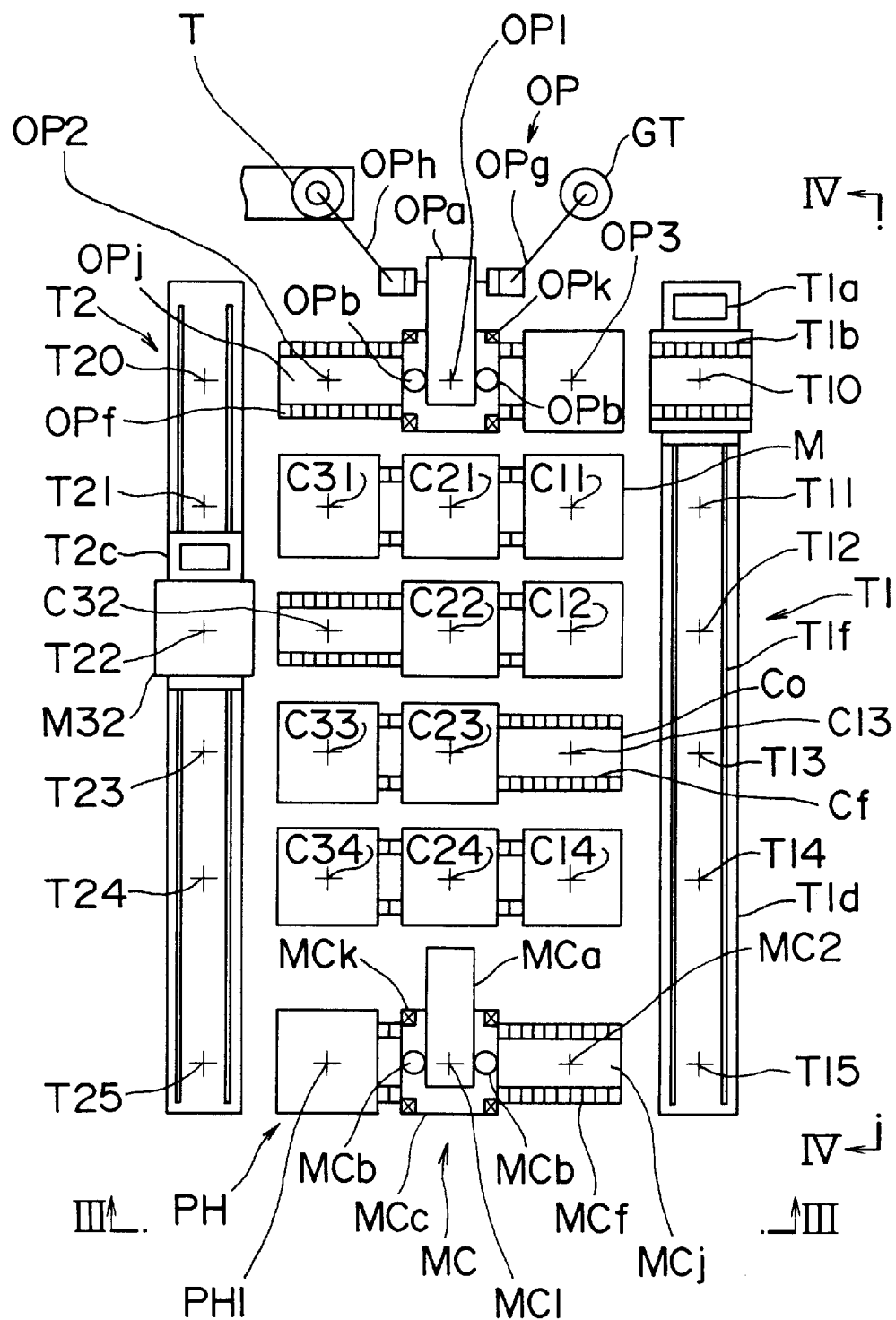
FIG. 4 is a plan view showing a tire vulcanizing method in accordance with one embodiment of the present invention and a tire vulcanizing system in accordance with a second embodiment for carrying out the same method.
Figure 5:
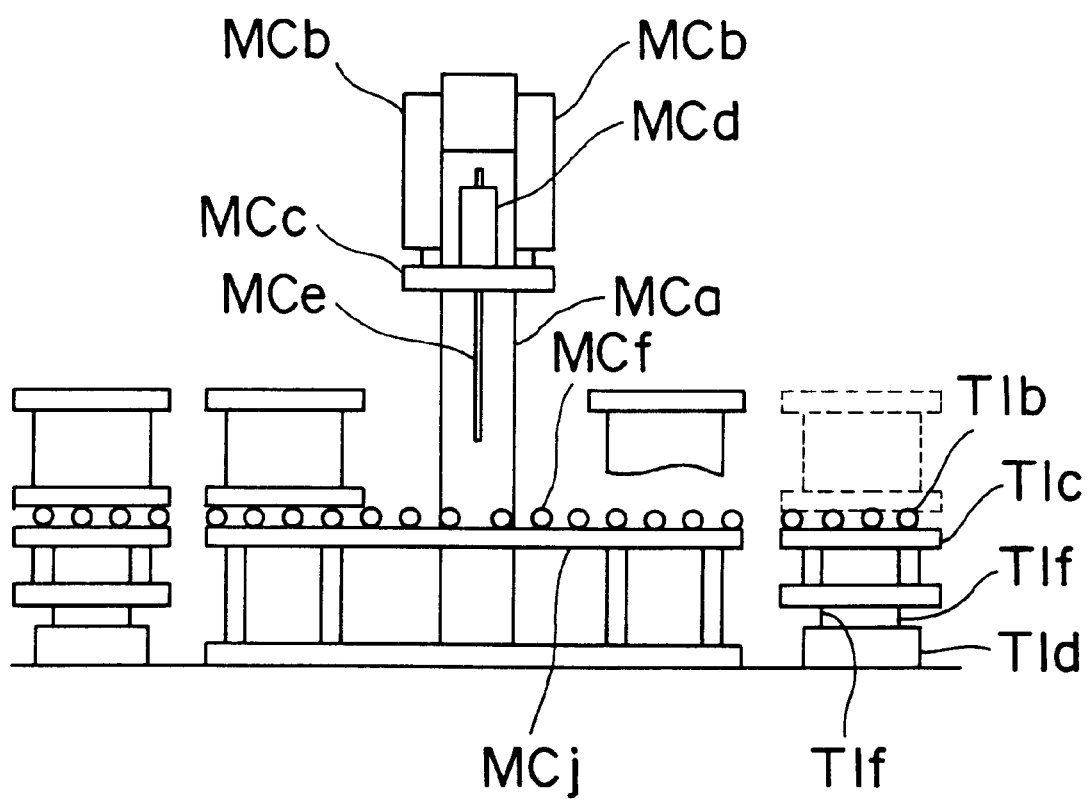
FIG. 5 is a view taken in the direction of the arrows along the line III—III of FIG. 4.
Figure 6:
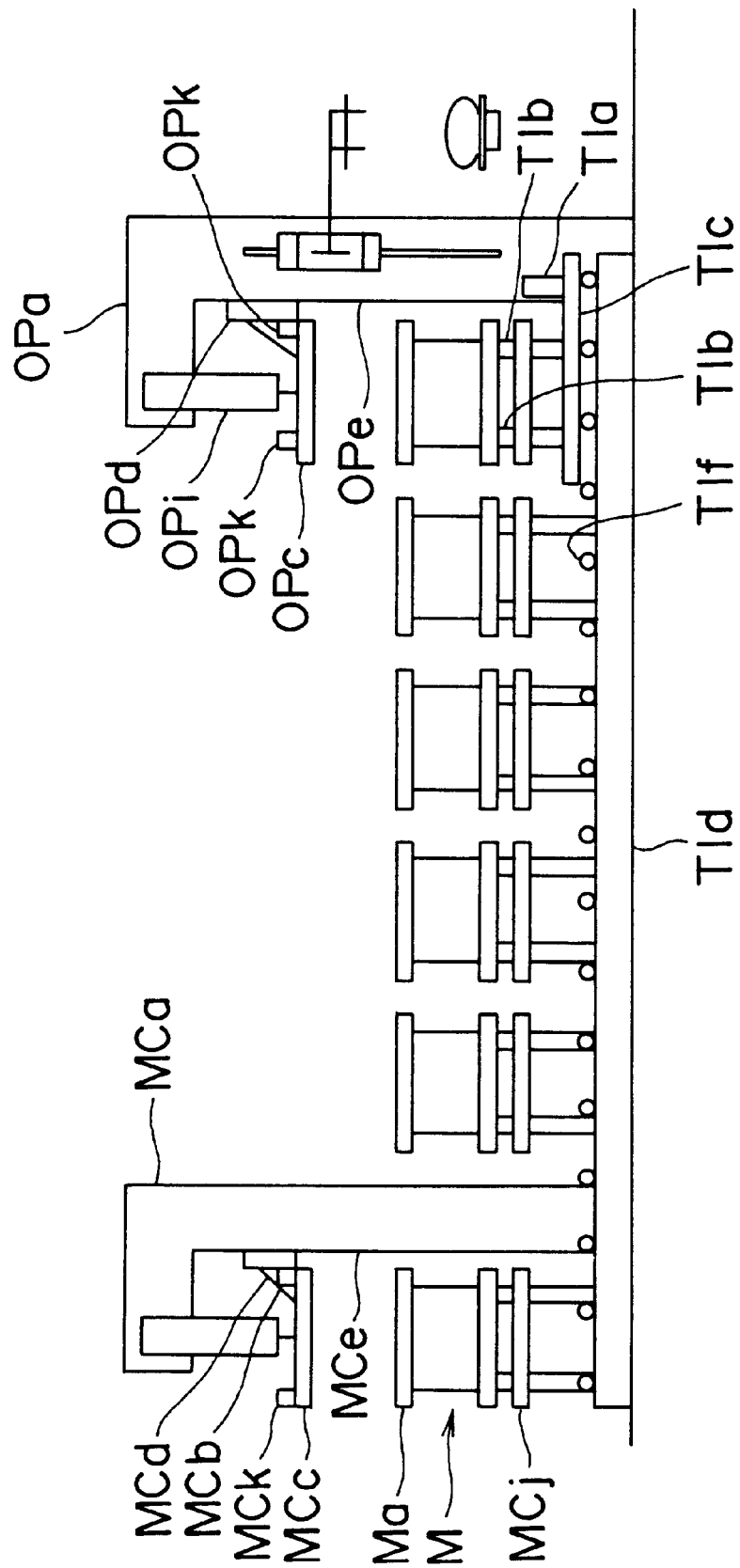
FIG. 6 is a view taken in the direction of the arrows along the line IV—IV of FIG. 4.

FIGS. 4 to 6 show a tire vulcanizing method in accordance with one embodiment of the present invention and a tire vulcanizing system in accordance with a second embodiment for carrying out the same method. FIG. 4 is a plan view thereof, FIG. 5 is a view taken in the direction of the arrows along the line III—III of FIG. 4, and FIG. 6 is a view taken in the direction of the arrows along the line IV—IV of FIG. 4.

As shown in FIG. 4, the tire vulcanizing system in accordance with the second embodiment comprises a plurality of rows of tire vulcanizing stations C11 to C34 which contain a plurality of sets of movable tire mold assemblies M (M11 to M33) and vulcanize tires, a mold opening/closing station OP1 which is disposed at these vulcanizing station C11 to C34 to receive the tire mold assembly M to remove a vulcanized tire T and insert a green tire GT by opening/closing the tire mold, and a first tire mold transporting device T1 and a second tire mold transporting device T2 which are disposed between the mold opening/closing station OP1 and the vulcanizing stations C11 to C34 to transport the tire mold assembly M. The vulcanizing system further comprises a discharge station OP2 which is disposed on the mold loading side of the mold opening/closing station OP1 to discharge a heating and pressurizing medium in a bladder assembly of the tire mold assembly M having been transported from the tire vulcanizing station C11 to C34, and a supply station OP3 for supplying the heating and pressurizing medium to a heating chamber of the tire mold assembly M and into the bladder assembly.

A first row of vulcanizing stations C11, C12, C13 and C14 are arranged so that their centers are on a straight line, and a second row of vulcanizing stations C21, C22, C23 and C24 are arranged in parallel with the first row, and further a third row of vulcanizing stations C31, C32, C33 and C34 are arranged. Although a total of twelve vulcanizing stations are arranged in this embodiment shown in FIG. 4, the number of vulcanizing stations may be increased, for example, by adding C15, C25 and C35.

The vulcanizing stations C11 to C34 each have a plurality of sets of travel guide rollers Cf provided on a base Co of the vulcanizing station. The tire mold assemblies M11 to M33 are arranged so as to be capable of being moved in the movement direction (for example, in the direction from vulcanizing station C11 to C21, or in the direction from C21 to C31) by means of these travel guide rollers Cf.

Since the tire mold assembly moves during operation, it cannot be specified in FIG. 4 which of the mold assemblies is M11. Therefore, M11 is typically indicated as a mold assembly M at the vulcanizing station C11 in FIG. 4.

Also, on the base of each of the vulcanizing stations C11 to C34, a positioning device (not shown) for positioning the mold assembly M having been moved is provided. By using this positioning device, the tire mold assembly M is fixed to a predetermined position, or it is released from its fixation.

On one end side of the rows of the vulcanizing stations C11 to C34, a mold opening/closing device OP is provided.

As shown in FIGS. 4 and 6, the mold opening/closing device OP comprises a frame OPa erected on a base OPj, a well-known loader OPg for loading a green tire GT which is capable of being moved vertically on a side surface of the frame OPa and swung between the center position of the mold opening/closing device (mold opening/closing station) OP1 and the waiting position, a well-known unloader OPh for unloading a vulcanized tire T which is similar to the loader OPg and is disposed on the side surface of the frame OPa on the side opposite to the loader OPg, an elevation guide rail OPe provided on a side surface of the frame OPa other than the side surfaces on which the loader OPa and the unloader OPh are mounted, a guide bracket OPd sliding on the elevation guide rail OPe, an upper movable plate OPc fixed to the guide bracket OPd, a well-known split mold opening/closing operation device OPi provided at the center of the upper movable plate OPc, and a plurality of sets of elevating cylinders OPb one end of which is fixed to the frame OPa and the other end of which is fixed to the upper movable plate OPc.

On the upper movable plate OPc, a mold connecting device OPk is provided to connect and disconnect the upper movable plate OPc to and from an upper plate Ma of the tire mold assembly M.

On the upper surface of the base OPj are provided guide rollers OPf and a positioning device (not shown) for positioning the tire mold assembly M having been moved, which are similar to those at the vulcanization stations C11 to C34.

Also, at the central portion of the base OPj, that is, at the mold opening/closing station OP1, an operating device (not shown) for a bladder assembly (not shown) incorporated in the tire mold assembly M and an internal pressure piping connecting device (not shown) for supplying a vacuum pressure and preshaping medium to the bladder assembly are provided.

At an intermediate position between the mold opening/closing station OP1 on the base OPj and a stop position T20 of the second tire mold transporting device T2, a heating/pressurizing medium discharge station OP2 is provided which has an internal pressure piping connecting device (not shown) for discharging a heating/pressurizing medium in the bladder assembly of the mold assembly M having been moved.

Also, at an intermediate position between the mold opening/closing station OP1 on the base OPj and a stop position T10 of the first tire mold transporting device T1, a heating/pressurizing medium supply station OP3 is provided which has an internal pressure piping connecting device (not shown) for supplying a heating/pressurizing medium into the bladder assembly of the mold assembly M having been delivered from the mold opening/closing station OP1 and an external pressure piping connecting device (not shown) for supplying a heating medium into an external heating chamber of the mold assembly M.

These internal pressure piping connecting device and external pressure piping connecting device have been disclosed in Japanese Patent Provisional Publication No. 7-80846 (No. 80846/1995) published by the inventor of this invention.

On the other end side of the vulcanizing stations (on the opposite side of the mold opening/closing device OP), a mold changing device MC and a mold preheating device PH are provided.

The mold changing device MC has a structure similar to that of the mold opening/closing device OP, but it differs from the mold opening/closing device OP in that the loader OPg for loading a green tire GT, the unloader OPh for unloading a vulcanized tire T, and the split mold opening/closing operation device OPi are not provided. That is to say, as shown in FIGS. 4 and 5, the mold changing device MC comprises a frame MCa, an elevating cylinder MCb, an upper movable plate MCc, a guide bracket MCd, an elevation guide rail MCe, a travel guide rollers MCf, a base MCj, and a mold connecting device MCk.

The mold preheating device PH is provided at an intermediate position (preheating station) PH1 between a mold changing station MC1 and a stop position T25 of the second tire mold transporting device T2. Also, a mold waiting station MC2 is provided at an intermediate position between the mold changing station MC1 and a stop position T15 of the first tire mold transporting device T1.

On the base MCj are provided the travel guide rollers MCf and positioning devices (not shown) at station positions MC1, MC2 and PH1. The preheating station PH1 is provided with an external piping connecting device (not shown).

On each side of the vulcanizing stations C11 to C14, C21 to C24, and C31 to C34, the mold opening/closing device OP, the mold changing device MC, and the mold preheating device PH, the first tire mold transporting device T1 and the second tire mold transporting device T2 are provided.

The first tire mold transporting device T1 can move between the stop position T10 at the front of the heating/pressurizing medium supply station OP3, stop positions T11, T12, T13 and T14 at the front of the vulcanizing stations C11, C12, C13 and C14, respectively, and the stop position T15 at the front of the mold waiting station MC2, and can stop as necessary.

Also, the second tire mold transporting device T2 can move between the stop position T20 at the front of the heating/pressurizing medium discharge station OP2, stop positions T21, T22, T23 and T24 at the front of the vulcanizing stations C31, C32, C33 and C34, respectively, and the stop position T15 at the front of the mold preheating station PH1, and can stop as necessary.

The first tire mold transporting device T1 and the second tire mold transporting device T2 have the same configuration. Therefore, only the first tire mold transporting device T1 will be described.

The first tire mold transporting device T1 is provided with a base T1$d$ along the vulcanizing stations C11, C12, C13 and C14, and a plurality of sets of guide rollers T1$f$ are provided on the base T1$d$. On these guide rollers T1$f$ is provided a first tire mold transporter T1$c$, which can be moved along the vulcanizing stations C11, C12, C13 and C14 by using a well-known driving unit T1$a$.

On the top surface of the first tire mold transporter T1$c$ are provided a plurality of sets of guide rollers T1$b$. The top level of the guide rollers T1$b$ is set so as to have a height equal to that of the guide rollers OPf on the base OPj, the guide rollers Cf of the vulcanizing stations C11, C12, C13 and C14, and the guide rollers MCf on the base MCj.

Also, the first tire mold transporter T1$c$ is provided with a mold transfer device (not shown) which is used for transferring the mold assembly M between the first tire mold transporter T1$c$ and the heating/pressurizing medium supply station OP3 or between the first tire mold transporter T1$c$ and the vulcanizing stations C11, C12, C13 and C14. For this not illustrated mold transfer device, Japanese Patent Provisional Publication No. 8-192429 (No. 192429/1996) published by the inventor of this invention should be referred to. Also, for the details of the tire assembly, Japanese Patent Provisional Publication No. 8-47928 (No. 47928/1996) and Japanese Patent Provisional Publication No. 9-29746 (No. 29746/1997) published by the inventor of this invention should be referred to.

Next, the tire vulcanizing method in accordance with one embodiment of the present invention and the operation of the tire vulcanizing system in accordance with the second embodiment for carrying out the same method will be described.

(1) When the completion of tire vulcanization in the tire mold assembly M32 at the vulcanizing station C32 is near at hand, a second tire mold transporter T2$c$ moves to the stop position T22 at the front of the vulcanizing station C32, and stops there.

(2) A mold receiving arm on a table of the second tire mold transporter T2$c$ is extended toward the vulcanizing station C32 and connected to a lower part of the tire mold assembly M32.

(3) The mold receiving arm is withdrawn, so that the tire mold assembly M32 slides on the guide rollers Cf of the vulcanizing station C32, and then transfers onto the guide rollers T2$b$ on the second tire mold transporter T2$c$ and slides on them. When the tire mold assembly M32 comes to a predetermined position, it stops there.

(4) When the tire mold assembly M32 stops, the lower part of the tire mold assembly M32 is fixed to the second tire mold transporter T2$c$. On the other hand, the second tire mold transporter T2$c$ moves to the mold opening/closing device OP side and stops at the stop position T20.

(5) After the second tire mold transporter T2$c$ stops, the mold receiving arm of the second tire mold transporter T2$c$ is extended toward the center of the discharge station OP2. Then, the mold receiving arm is disconnected from the lower part of the tire mold assembly M32, and is withdrawn toward the second tire mold transporter T2$c$.

Thereafter, the second tire mold transporter T2$c$ moves to a stop position (T21, T22 or T23) at the front of the vulcanizing station at which the next vulcanization is to be finished, and waits there.

On the other hand, when the mold assembly M32 stops at the position of the discharge station OP2, an internal pressure discharge device is connected, by which the heating/pressurizing medium in the bladder assembly of the tire mold assembly M32 is discharged. The tire mold assembly M32 waits until the time when the mold opening/closing device OP can receive the mold assembly.

(6) In the mold opening/closing device OP, the tire mold assembly brought to the front of the mold assembly M32 having been subjected to a predetermined work is discharged to the heating/pressurizing medium supply station OP3.

Also, the upper movable plate OPc of the mold opening/closing device OP waits at a position slightly higher than the tire mold assembly M32 in such a manner as not to obstruct the movement of the tire mold assembly M32 to be moved to under the upper movable plate OPc.

(7) When the tire mold assembly M32 stops at the center position (mold opening/closing station) OP1 of the mold opening/closing device OP, the lower part of the tire mold assembly M32 is fixed. On the other hand, the upper movable plate OPc lowers and is connected to an upper part of the tire mold assembly M32.

(8) Next, the upper movable plate OPc starts to rise, and at the same time, the split mold device (not shown) at the center of the upper movable plate OPc operates so that an upper mold starts to open. When the upper movable plate OPc continues to rise, the upper mold is opened fully and reaches the upper limit position.

A vulcanized tire T remains on a lower mold, and the bladder assembly (not shown) provided at the center of the lower mold of the tire mold assembly is operated by a bladder driving device (not shown) provided at the center of the lower part of the mold opening/closing device OP, so that a bladder B is peeled from the inside of the tire.

(9) At an appropriate time, the unloader OPh advances and lowers, holds an upper bead portion of the vulcanized tire T on the lower mold, and then rises and discharges the vulcanized tire T. This discharged tire is conveyed to the next process by using a discharge conveyor (not shown).

(10) On the other hand, the loader OPg advances and lowers at an appropriate time while holding a green tire GT, and puts the green tire GT on the lower mold. Then, the bladder driving device is operated to insert a bladder B into the green tire GT. At an appropriate time, the loader OPg releases the green tire GT, and rises and retreats.

(11) Then, the upper movable plate OPc lowers so that the opened upper mold moves to the closing position.

After the upper mold is closed, the upper movable plate OPc is disconnected from the upper mold, and rises to a height such as to permit the passage of the tire mold assembly M32. On the other hand, the lower part of the mold assembly M32 is released.

The mold assembly M32 moves and stops at the heating/pressurizing medium supply station OP3, where an internal pressure supply device and an external pressure supply device are connected to the tire mold assembly M32, by which the heating/pressurizing medium is supplied and the vulcanization of tire is started.

This heating/pressurizing medium is in a state such as to be confined by a check valve provided on the mold assembly. During the above-described operation, the first tire mold transporter T1c waits at the stop position T10.

(12) A mold receiving arm is extended from the first tire mold transporter T1c, and is connected to the lower part of the tire mold assembly M32.

Then, the arm is withdrawn. The tire mold assembly M32 slides on the guide rollers OPf, and then transfers onto the guide rollers T1b on the first tire mold transporter T1c and slides on them. When the tire mold assembly M32 comes to a predetermined position, it stops there.

(13) The lower part of the tire mold assembly M32 is fixed to the first tire mold transporter T1c, and the first tire mold transporter T1c moves along the vulcanizing stations and stops.

The stop position is the stop position T12 at the front of the tire mold assembly M12 arranged abreast of the tire mold assembly M32 having been moved in items (1), (2) and (3) of the description of operation.

After the tire mold assembly M32 is received by the second tire mold transporter T2c, the tire mold assembly M22 in which vulcanization is being performed is moved from the adjacent vulcanizing station C22 to the vulcanizing station C32 having become empty. Then, the tire mold assembly M12 in which vulcanization is being performed is moved from the vulcanizing station C12 to the vulcanizing station C22.

Therefore, the vulcanizing station C12 on the side of the first tire mold transporter T1c is empty, so that it can receive the tire mold assembly M32 for which the predetermined work has been finished by the mold opening/closing device OP.

(14) When the first tire mold transporter T1c stops at the stop position T12 at the front of the vulcanizing station C12, the tire mold assembly M32 is released. Then, the arm of the first tire mold transporter T1c is extended, so that the tire mold assembly M32 slides on the guide rollers T1b on the transporter, and then transfers onto the guide rollers Cf of the vulcanizing station C12 and slides on them, and stops.

(15) After the tire mold assembly M32 stops, the arm is withdrawn toward the transporter, and the transporter moves to the position T10 of the mold opening/closing device side and stops for waiting until it receives the next mold assembly.

For the tire vulcanizing system in accordance with the second embodiment of the present invention, the operation in producing tires and the procedure for changing a tire mold device during the production are the same as those in the first embodiment.

Figure 7:
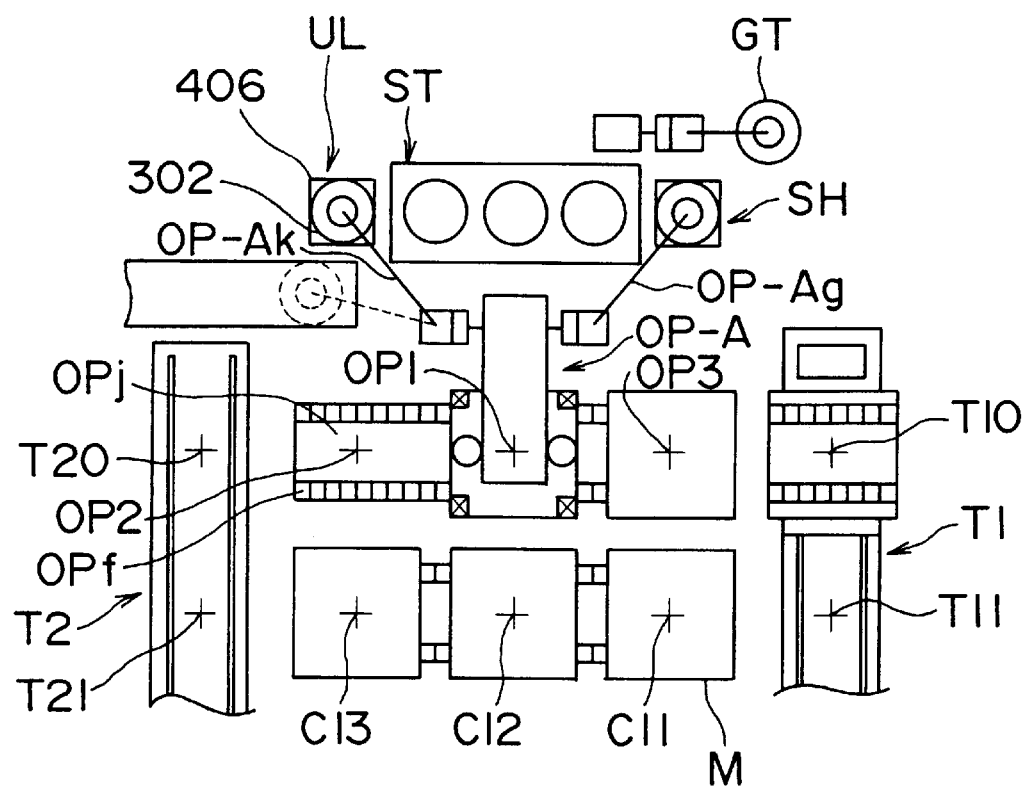
FIG. 7 is a plan view showing a tire vulcanizing method in accordance with another embodiment of the present invention and a part of a tire vulcanizing system in accordance with a third embodiment for carrying out the same method.
Figure 8:
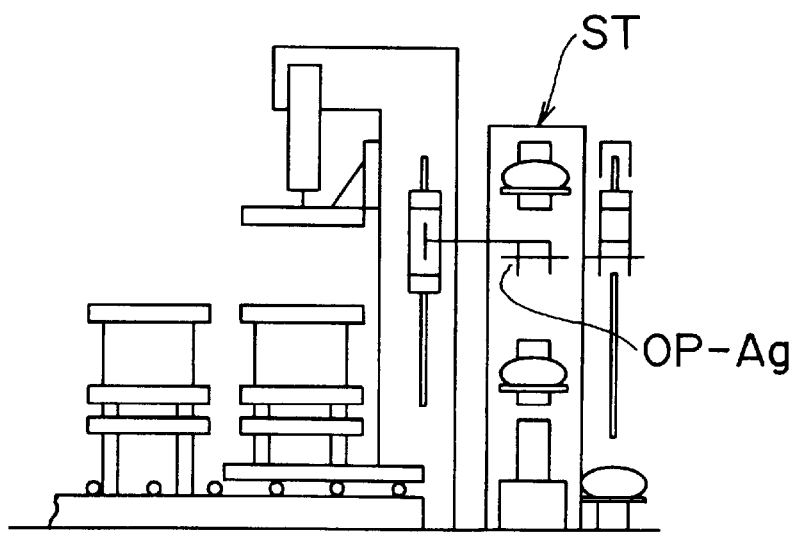
FIG. 8 is a front view showing a part of the tire vulcanizing system shown in FIG. 7.
Figure 9:
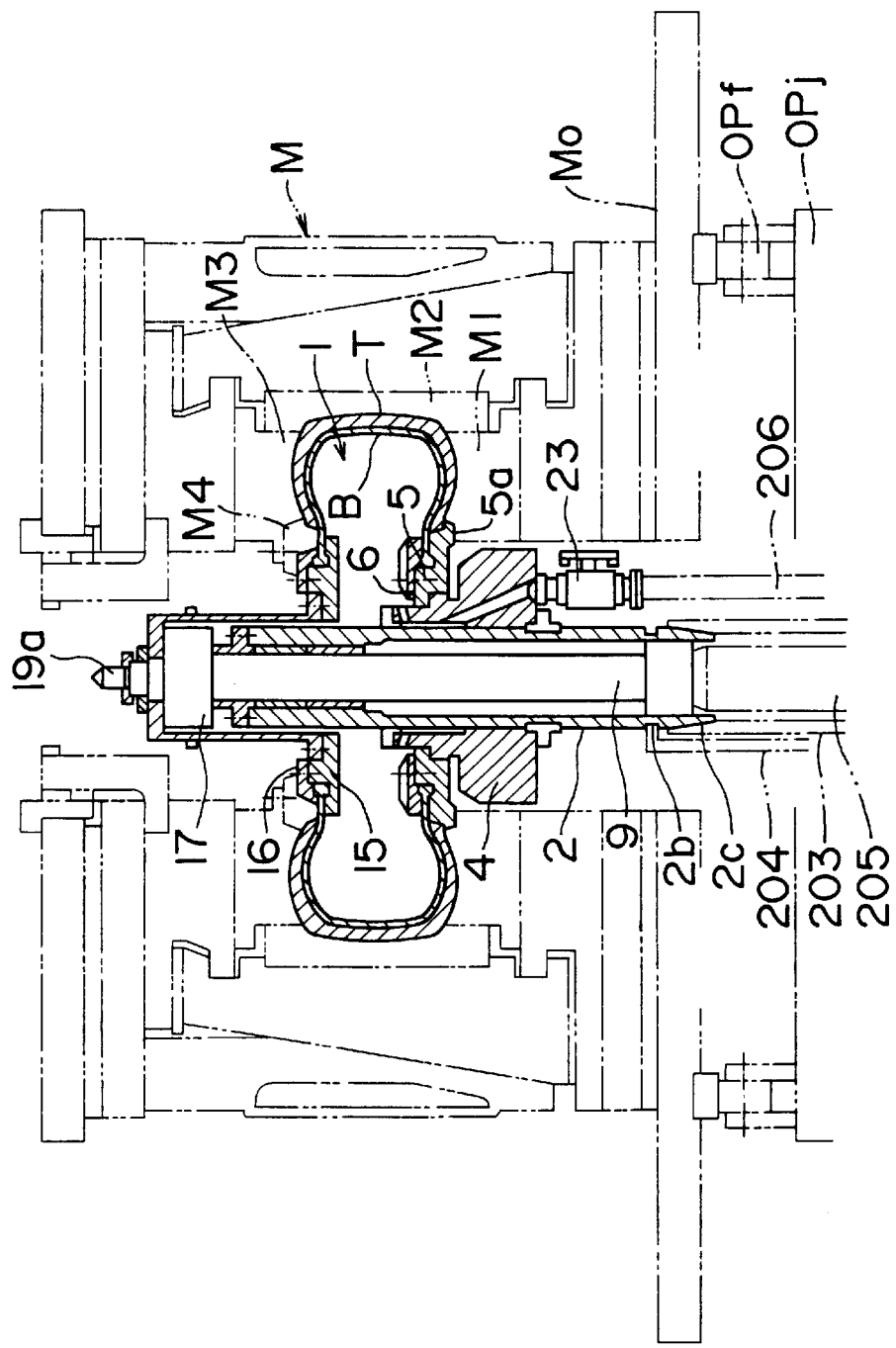
FIG. 9 is a sectional view showing one example of a bladder assembly used when the tire vulcanizing method in accordance with another embodiment of the present invention is carried out, showing a state in which the bladder assembly is incorporated in a mold assembly.
Figure 10:
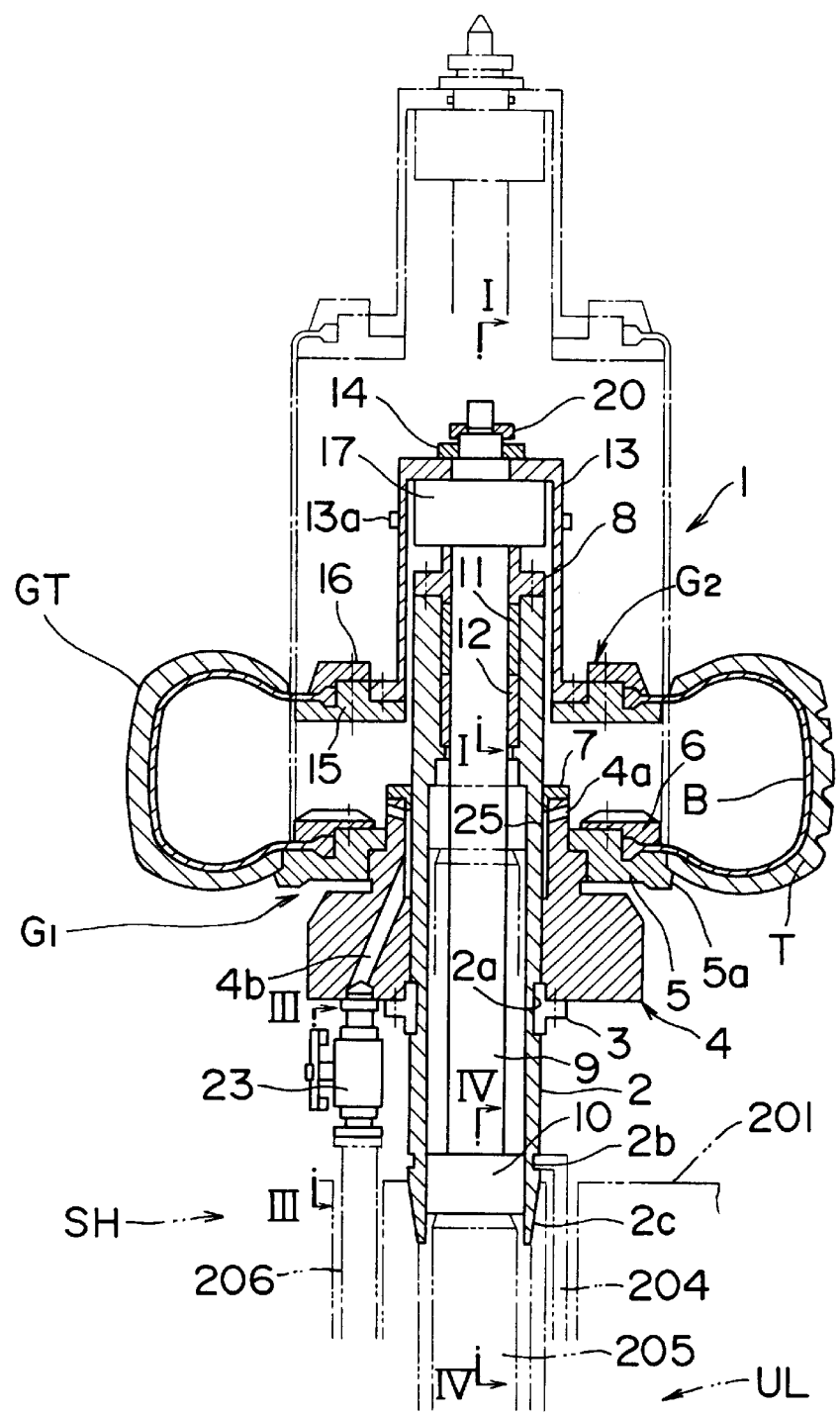
FIG. 10 is a sectional view showing the details of a structure of the bladder assembly shown in FIG. 9, showing a state in which the bladder is expanded.
Figure 11:
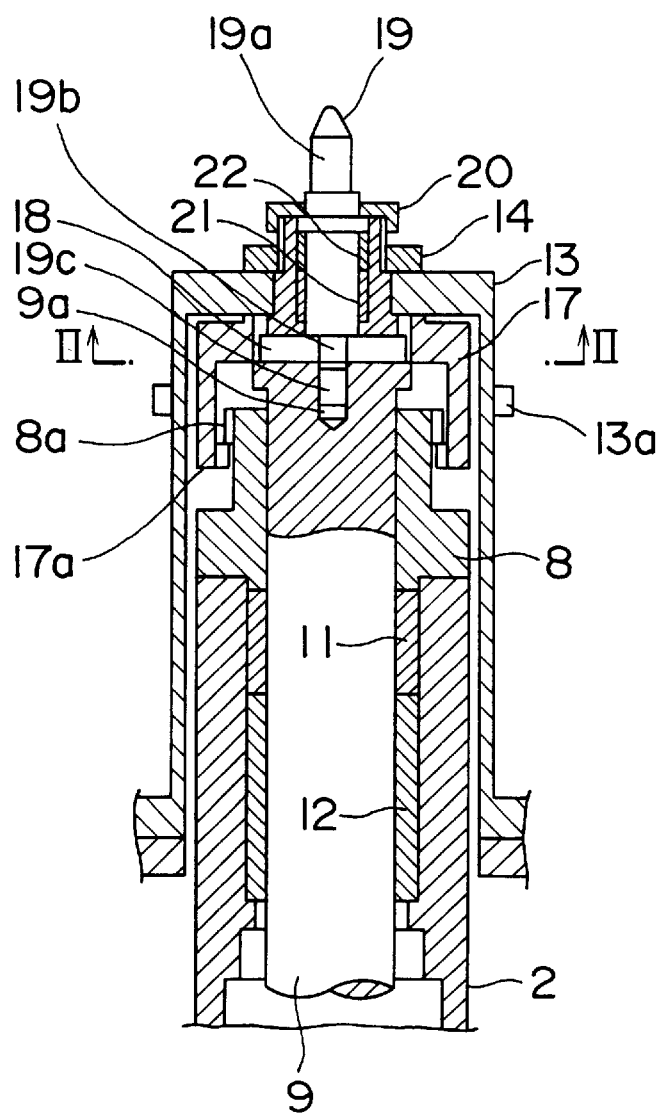
FIG. 11 is a view showing the structure of the bladder assembly, FIG. 11(a) being an enlarged sectional view taken along the line I—I of FIG. 10, and FIG. 11(b) being a partial sectional view of FIG. 11(a)
Figure 11:
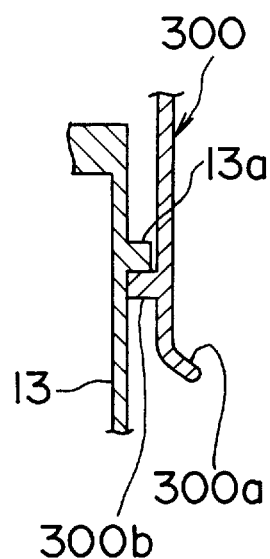
Figure 12:
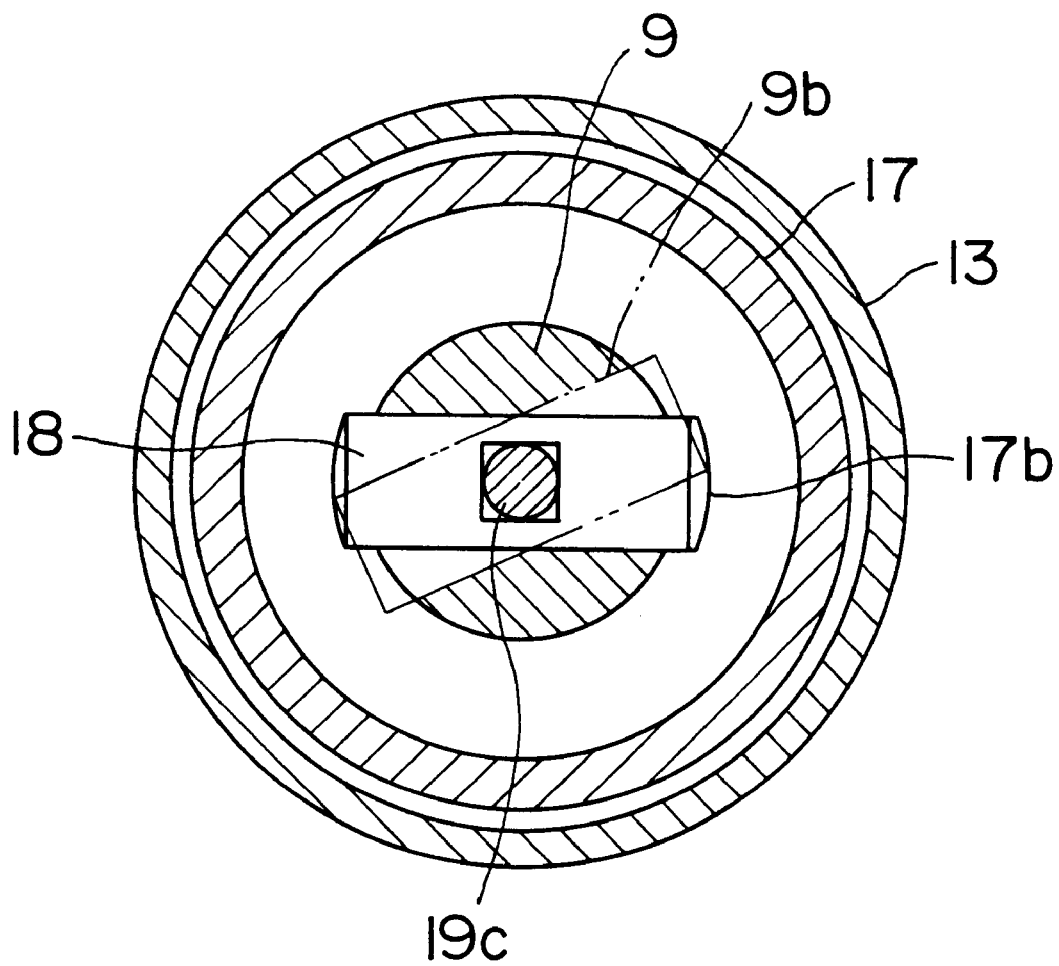
FIG. 12 is a sectional view taken along the line II—II of FIG. 11(a)
Figure 13:
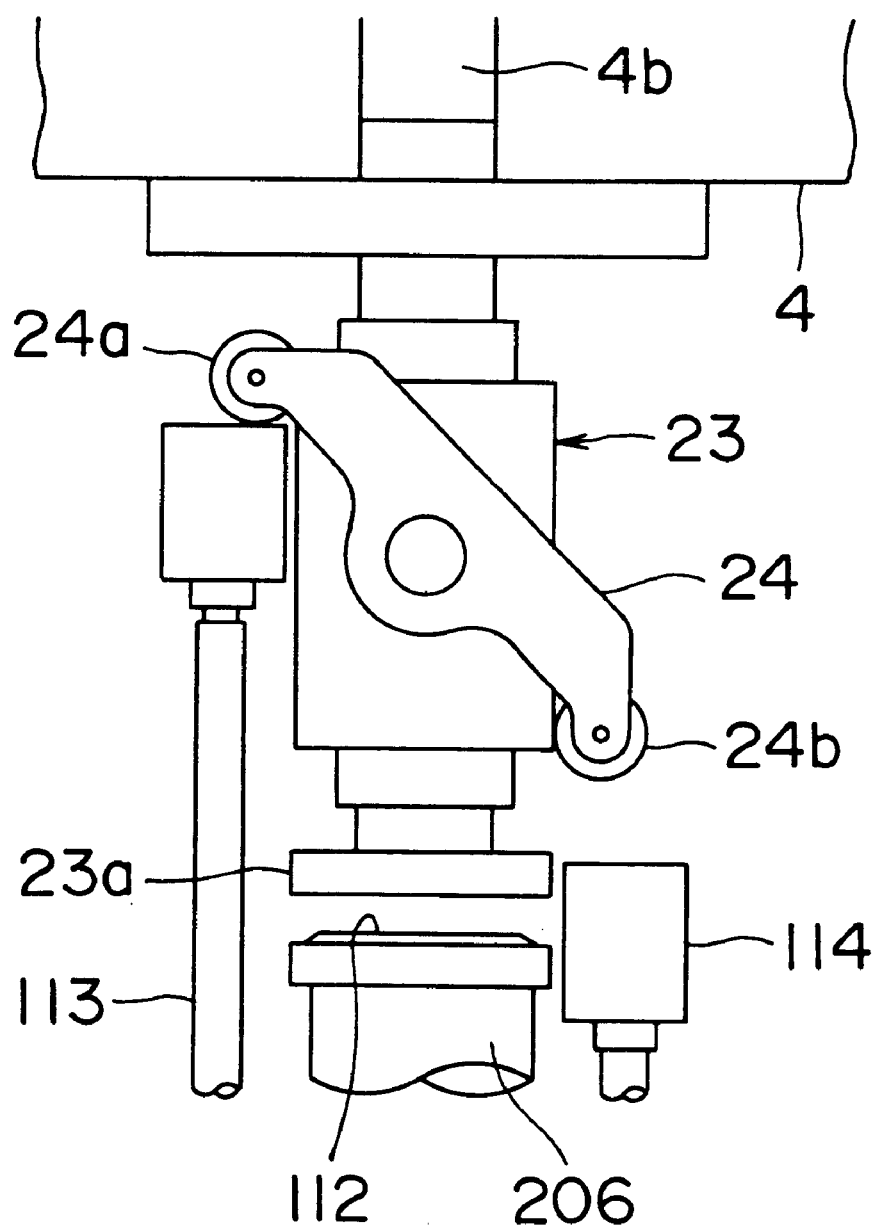
FIG. 13 is a view taken in the direction of the arrows along the line III—III of FIG. 10.
Figure 14:
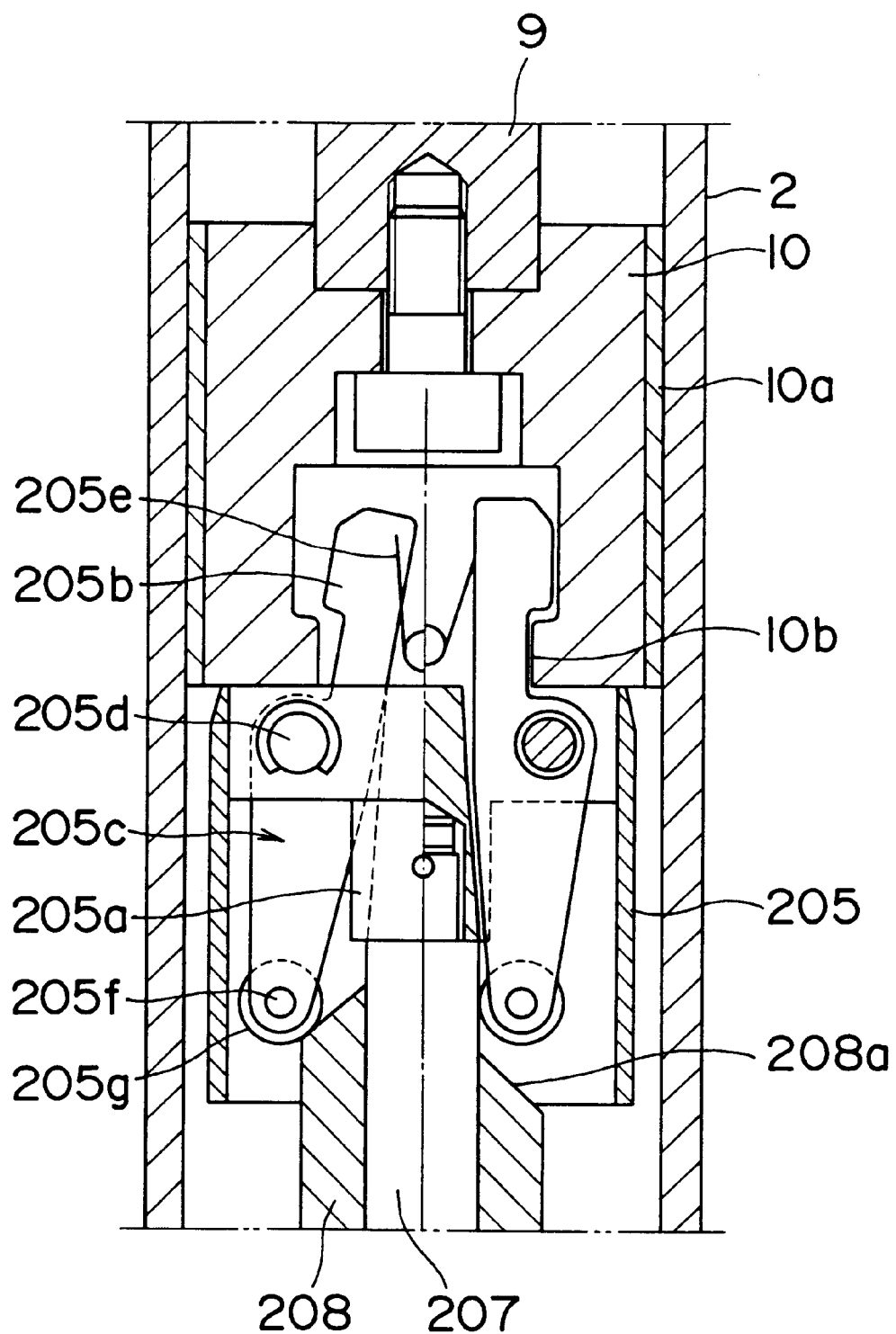
FIG. 14 is a sectional view taken along the line IV—IV of FIG. 10.

FIGS. 7 and 8 show a tire vulcanizing method in accordance with another embodiment of the present invention and a tire vulcanizing system in accordance with a third embodiment for carrying out the same method. FIG. 7 is a plan view thereof, and FIG. 8 is a front view showing a part of the tire vulcanizing system shown in FIG. 7. Also, FIG. 9 to 15 show one example of a bladder assembly used when the tire vulcanizing method in accordance with this embodiment is carried out. FIG. 9 is a sectional view showing a state in which the bladder assembly is incorporated in a mold assembly, FIG. 10 is a sectional view showing a state in which a bladder is expanded, FIG. 11 is a sectional view taken along the line I—I of FIG. 10, FIG. 12 is a sectional view taken along the line II—II of FIG. 11(a), FIG. 13 is a view taken in the direction of the arrows along the line III—III of FIG. 10, and FIG. 14 is a sectional view taken along the line IV—IV of FIG. 10.

The tire vulcanizing system in accordance with the third embodiment differs from that in accordance with the second embodiment in the following respects: For the tire vulcanizing system in accordance with the second embodiment, the bladder assembly used in this embodiment is fixed to the tire mold assembly M, and a means for connecting an upper part of the bladder assembly to an lower part thereof is not provided, and also the loader OPg provided on the mold opening/closing device OP loads only a green tire GT, and the unloader OPh unloads only a vulcanized tire T.

By contrast, for the tire vulcanizing system in accordance with the third embodiment, a bladder assembly 1 used in this embodiment can be separated from a mold assembly M, and a means capable of connecting and disconnecting an upper part of the bladder assembly 1 to and from a lower part thereof is provided, and also a loader OP-Ag provided on the mold opening/closing device OP-A loads a green tire GT and the bladder assembly 1 in an integrated state, and an unloader OP-Ah unloads a vulcanized tire T and the bladder assembly 1 in an integrated state.

Also, the tire vulcanizing system in accordance with the third embodiment differs from that in accordance with the second embodiment in that in the vicinity of the mold opening/closing device OP-A are provided a separation station UL for separating the bladder assembly 1 from the vulcanized tire T, a shaping station SH for assembling the bladder assembly 1 to the green tire GT in advance and for performing shaping, and a storage station ST for storing the separated bladder assembly 1.

Therefore, the vulcanizing stations C11 to C34, the mold opening/closing station OP1, the heating/pressurizing medium discharge station OP2, the heating/pressurizing medium supply station OP3, the first and second tire mold transporting devices T1 and T2, the mold changing station MC1, the mold waiting station MC2, the mold preheating station PH1, and the mold assembly M (the bladder assembly 1 differs from that of the second embodiment) in the second embodiment are the same as in the third embodiment. Therefore, the description of these elements is omitted.

Also, the mold opening/closing device OP-A of the third embodiment comprises the same elements as the base OPj, the frame OPa, the elevation guide rail OPe, the guide bracket OPd, the upper movable plate OPc, the slit mold opening/closing operation device OPi, and the plurality of sets of elevating cylinders OPb, which constitute the mold opening/closing device OP of the second embodiment.

FIG. 9 shows a state in which the green tire GT and the bladder assembly 1 were loaded during the time when the mold assembly M was opened, the mold assembly M was closed, and vulcanization has been started. In this figure, parts constituting the mold assembly M and the base OPj are indicated by the two-dot chain lines.

In this embodiment, there is used the mold assembly M of a type such that the mold can be kept in the closed state by the operation of the mold itself against a force for opening the mold, which force is generated by the operation of a heating/pressurizing medium introduced into a bladder B during the vulcanization of tire.

This mold assembly M, although the details thereof is omitted because it has been disclosed in Japanese Patent Provisional Publication No. 8-47928 (No. 47928/1996) and so on, comprises a base plate Mo for the mold assembly, a lower side wall mold M1, a plurality of tread molds M2 divided along the circumferential direction, an upper side wall mold M3, and an upper bead ring M4 bolted to the upper side wall mold M3. A lower bead ring 5a, which constitutes a part of the mold during vulcanization, is integrated with a flange 5 of a holding member G1 for holding the lower end of the bladder B of the bladder assembly 1.

Also, the mold assembly M is provided with the base OPj for the mold opening/closing device OP-A shown in FIGS. 7 and 8, guide rollers OPf assembled on the top surface of the base OPj, and an elevating device 203 which is incorporated in the base OPj so as to be capable of vertically moving the bladder assembly 1. The periphery at the upper end of the elevating device 203 is formed with a conical face which engages with a conical face 2c of the outer periphery at the lower end of an outer shaft 2 of the bladder assembly 1.

The elevating device 203 receives the bladder assembly 1 at its rising position when the bladder assembly 1 is inserted into and removed from the mold. Also, the rising operation at the time of removal also separates the vulcanized tire T from the lower side wall mold M1.

At the outer periphery at the lower end of the outer shaft 2 of the bladder assembly 1, a lock claw 204 is provided to lock the outer shaft 2 to the elevating device 203. The tip end of the lock claw 204 engages with a peripheral groove 2b formed on the outer peripheral surface of the outer shaft 2. Also, an inner shaft 9 is attached to and detached from a piston rod tip end of a post cylinder (not shown) via a connecting device 205. Further, a pipe 206 of an internal pressure piping connecting device is incorporated in a table 201 so as to be capable of moving vertically, and a well-known sealing member is provided on the contact surface in contact with a valve 23. At the heating/pressurizing medium discharge station OP2, the heating/pressurizing medium in the bladder assembly is discharged through the pipe 206, and at the heating/pressurizing medium supply station OP3, the heating/pressuring medium is supplied.

The same elements as the elevating device 203, the lock claw 204, the connecting device 205, and the pipe 206 are provided at the position of the later-described separation station UL.

The right half of FIG. 10 shows a state in which the vulcanized tire T and the bladder assembly 1 are placed at the separation station UL, and the left half of FIG. 10 shows a state in which the green tire GT and the bladder assembly 1 are placed at the shaping station SH where preassembling and shaping are performed. The bladder assembly 1 including the bladder B is indicated by the solid line, and the parts belonging to the separation station UL and the shaping station SH are indicated by the two-dot chain line. The dash-and-dot line indicates a state in which the bladder B of the bladder assembly 1 is expanded.

As shown in FIGS. 10 and 11, a base flange 4 is fixed to the outer shaft 2 by bolting it to a two-piece ring 3 inserted in a peripheral groove 2a formed on the outer peripheral surface of the outer shaft 2.

The holding member G1 for holding the lower end of the bladder B holds the lower end of the bladder B between the flange 5 and a press plate 6 so that the press plate 6 is bolted to the flange 5, by which the lower end of the bladder B is held and fixed. The flange 5 has a construction such as to be fixed to the outer shaft 2 via the base flange 4 by being screwed and fixed to the base flange 4.

Also, an extension outer shaft 8 is formed with a plurality of retaining claws 8a disposed at equal intervals on the outside at the upper end, and is bolted to the upper end of the outer shaft 2. The inner shaft 9 is inserted in the outer shaft 2 so as to be slidable in the axial direction, and a well-known sealing member 11 and a guide bush 12 are disposed between the outer shaft 2 and the inner shaft 9. At the lower end portion of the inner shaft 9 is fixed a later-described connecting flange 10, and the upper end portion of an outer cylinder 13 is fitted to the upper end portion of the inner shaft 9. The outer cylinder 13 is fixed to the inner shaft 9 by screwing a nut 14.

On the other hand, a holding member G2 for holding the upper end of the bladder B holds the upper end of the bladder B between the flange 15 and a press plate 16 so that the press plate 16 is bolted to the flange 15, by which the upper end of the bladder B is held and fixed. The flange 15 has a construction such as to be fixed to the inner shaft 9 via the outer cylinder 13 by being bolted to the lower end flange of the outer cylinder 13.

At the outer periphery of the outer cylinder 13 is formed a protrusion 13a which engages with an expandable holding claw of the unloader OP-Ah or the loader OP-Ag when the bladder assembly 1 and the vulcanized tire T are unloaded or the bladder assembly 1 and the green tire GT are loaded.

As shown in FIG. 11(a), at the upper end portion of the inner shaft 9 is rotatably assembled a clawed flange 17, and a plurality of claws 17a are formed at equal intervals in the circumferential direction on the inside at the lower end of the clawed flange 17. When the outer shaft 2 and the inner shaft 9 slide relatively in the axial direction, the retaining claws 8a and the claws 17a lock to each other or pass through each other in accordance with the rotational angle of the clawed flange 17.

As shown in FIG. 12, a rotating means for the clawed flange 17 is made up of a key 18 which is inserted in a square claw 9b formed in the direction perpendicular to the axis of the inner shaft 9 and both ends of which engage with key grooves 17b formed in rotational slide holes of the clawed flange 17 with respect to the inner shaft 9, a shaft 19 which is rotatably assembled concentrically at the upper end of the inner shaft so that a lower end side square cross-sectional portion 19b is formed at the center of the key 18, a well-known sealing member 21, a guide bush 22, and a cap nut 20 for preventing coming-off.

The upper end portion 19a of the shaft 19 has a square cross section for the connection with a rotation driving means provided on the later-described unloader OP-Ah and loader OP-Ag, and the lower end circular cross-sectional portion 19c thereof is inserted in a round hole 9a formed in the inner shaft 9.

As shown in FIGS. 10 and 13, on the bottom surface of the base flange 4, the valve 23 (a ball valve is used in this example shown in the figure) is fixed to confine a pressurizing medium sealed in the bladder B when the bladder assembly 1 is transported. This valve 23 is connected to a fluid chamber 25 via a passage 4b in the base flange 4.

The fluid chamber 25 is formed by the base flange 4, a flange 7 bolted to the base flange 4, and the outer shaft 2, and communicates with the interior of the bladder B via a plurality of nozzles 4a.

In FIGS. 9 and 10, reference numeral 201 denotes a table of the separation station UL or the shaping station SH, having, on the inside thereof, a conical face engaging with the conical face 2c formed on the outside at the lower end of the outer shaft 2, 204 denotes a lock claw the tip end of which engages with the peripheral groove 2b formed on the outer peripheral surface of the outer shaft 2 to lock the outer shaft 2 to the table 201, and 205 denotes the connecting device for attaching and detaching the inner shaft 9 to and from an inner shaft elevation driving device. The right half of FIG. 14 shows a connected state, and the left half thereof shows a disconnected state.

As shown in FIG. 14, a connecting flange 10 is bolted to the lower end portion of the inner shaft 9, a guide bush 10a is fixed on the outer peripheral surface of the connecting flange 10, and a ring-shaped protrusion 10b is formed on the inside at the lower end.

The upper ends of a plurality of levers 205c each having a protrusion 205b for holding the protrusion 10b from the upside are disposed in the connecting flange 10, and these levers 205c are assembled to a body 205a of the connecting device 205 via a pin 205d.

Between the upper ends of the lever 205c is inserted an urging spring 205e. The urging force of the spring 205e is applied in the direction such that the upper ends of the levers 205c are opened.

The upper end of an output shaft 207 of the elevation driving device is screwed and fixed to the body 205a of the connecting device 205. The inner shaft 9 is raised by being pushed by the body 205a via the connecting flange 10 with the rise of the output shaft 207, and is lowered by the lowering of the output shaft 207 via the body 205a, the pin 205d, the protrusion 205b of the lever 205c, and the protrusion 10b of the connecting flange 10.

At the lower end of the lever 205c is rotatably assembled a roller 205g via a pin 205f. Therefore, the lever 205c is swayed by a cam 208 which pushes the roller 205g on a conical face 208a formed on the top surface of cam 208, which cam 208 moves vertically by the operation of a cylinder (not shown) with the output shaft 207 being a guide. As a result, the upper end portions of the levers 205c is decreased in diameter, by which the inner shaft 9 is disconnected from the inner shaft elevation driving device.

The pipe 206 for the pressurizing medium is incorporated in the table 201 so as to move vertically. A well-known sealing member 112 is provided on the top face of the pipe 206 to maintain airtightness of the contact surface when the top face of the pipe 206 comes into contact with a lower flange 23a of the valve 23.

The valve 23 has opening/closing levers 113 and 114 shown in FIG. 13. These opening/closing levers 113 and 114 are configured so that one is raised while the other is lowered by a driving means (not shown). At both ends of an operating lever 24 of the valve 23, loaders 24a and 24b are rotatably provided via a pin, so that by pushing either one of the loaders 24a and 24b, the opening and closing of the valve 23 are performed.

The unloader OP-Ag for unloading the vulcanized tire T and the bladder assembly 1 differs from the well-known unloader for unloading only the vulcanized tire T (the unloader OPh of the second embodiment) in the following respect.

Although the well-known unloader OPh is provided with expandable holding claw which holds an upper bead portion of the tire T from the inside, the expandable holding claw 300 of the unloader OP-Ah is provided with a tire holding outside protrusion 300a and a bladder assembly holding protrusion 300b as shown in FIG. 11(b), so that the holding claw 300 selectively can hold the bead portion of tire T by the diameter increasing operation or can hold the outer cylinder 13 of the bladder assembly 1 by the diameter decreasing operation as necessary.

The loader OP-Ag for loading the green tire GT and the bladder assembly 1 is the same as the unloader OP-Ah. Therefore, the explanation thereof is omitted.

Figure 15:
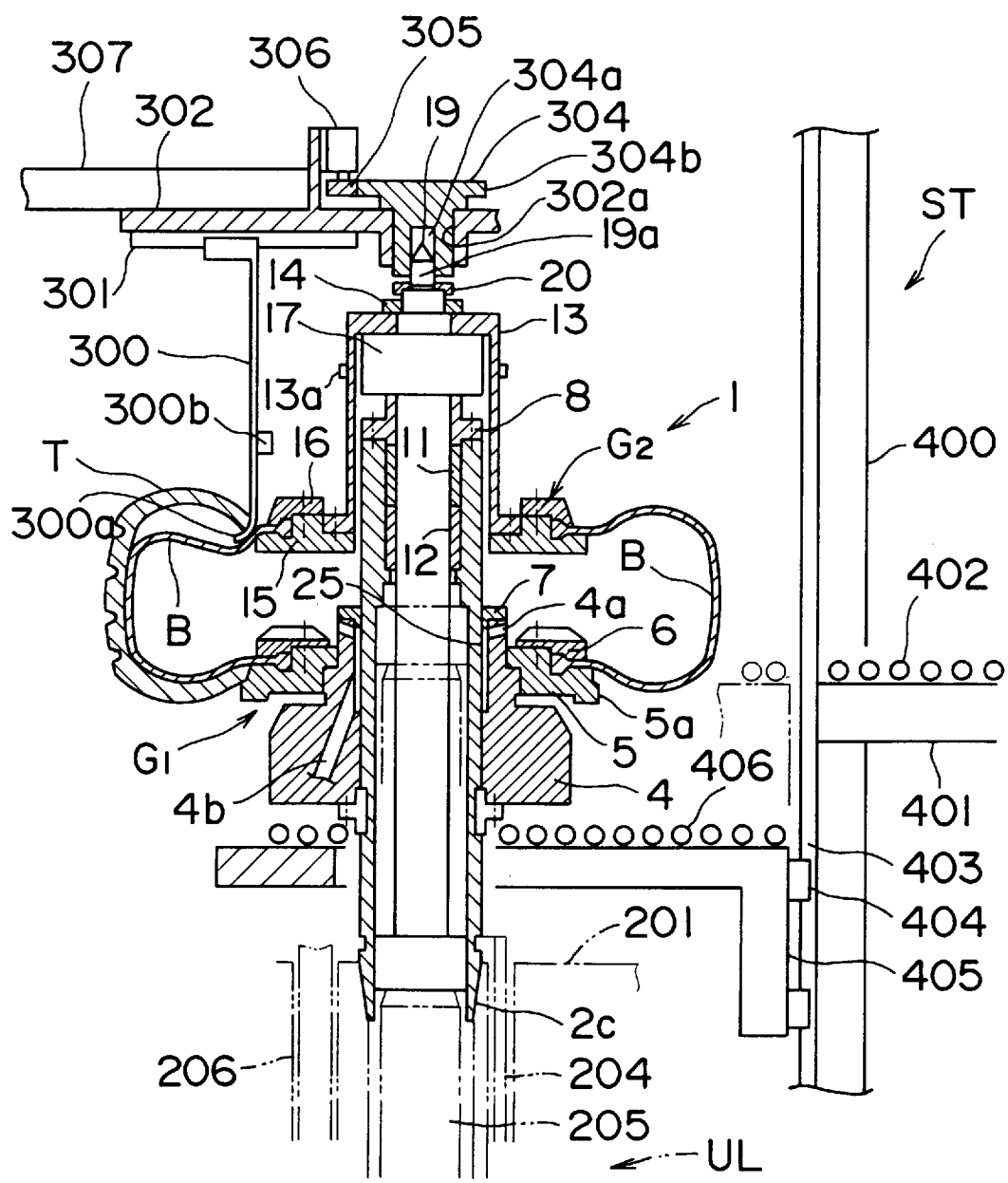
FIG. 15 is a sectional view showing a separation station and a storage station.
Figure 16:
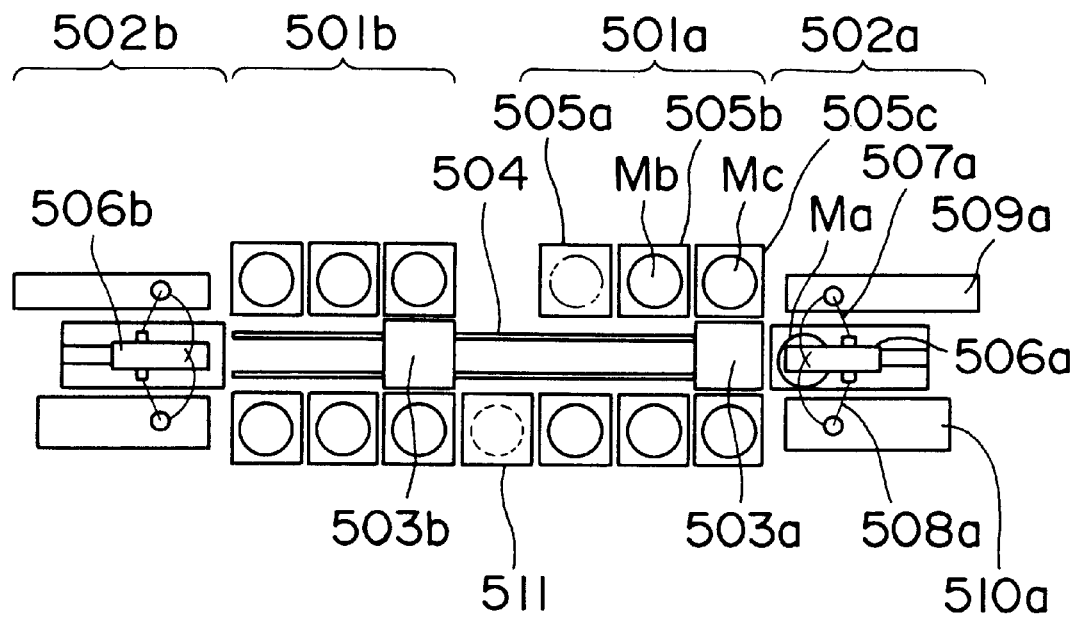
FIG. 16 is a plan view of a conventional tire vulcanizing system.
Figure 17:
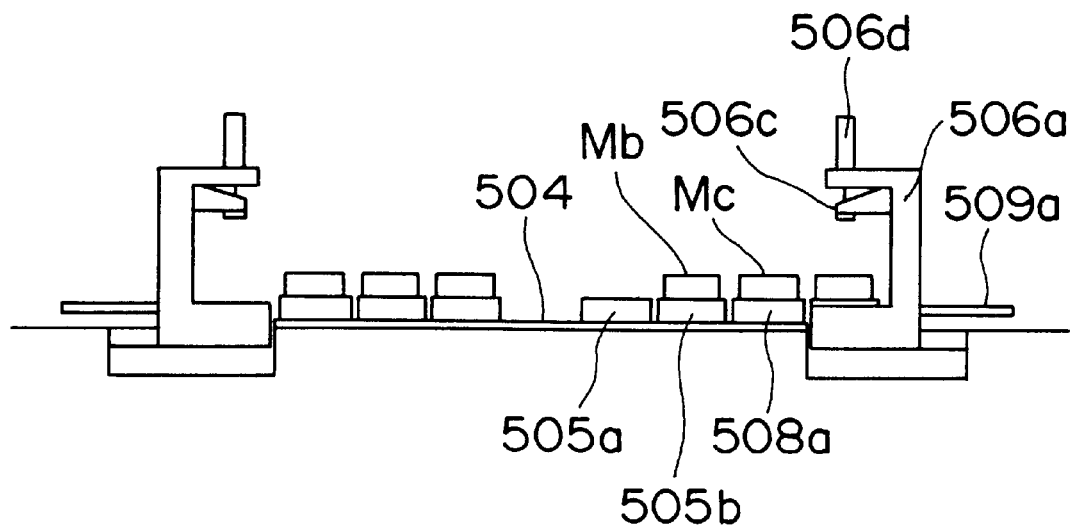
FIG. 17 is a front view of the conventional tire vulcanizing system.

FIG. 15 shows the separation station UL and the entrance side of the storage station ST for the bladder assembly 1. The left half of the bladder assembly 1 in FIG. 15 shows a state in which the vulcanized tire T and the bladder assembly 1 are carried and placed at the separation station UL, and the right half of the bladder assembly 1 in FIG. 15 shows a state in which the vulcanized tire T is removed and the bladder assembly 1 is coming close to the storage station ST.

Before the bladder assembly 1 is placed at the separation station UL, a loading table 405 on the entrance side of the storage station ST is located at a lower position as indicated by the solid line in FIG. 15 not to obstruct the placing of the bladder assembly 1.

The bladder assembly 1 is provided with a well-known arm 307 capable of moving vertically and swinging, and a disk 302 is fixed to one end of the arm 307. The disk 302 is radially provided with guides 301 so that the holding claw 300 guided by the guide 301 can be expanded and contracted by a driving unit (not shown). The tire holding protrusion 300a is provided at the lower end of the holding claw 300, and the protrusion 300b which engages with the protrusion 13a of the bladder assembly 1 at the diameter decreasing time of the holding claw 300 is provided above the protrusion 300a.

At the center of the disk 302 is provided a drive shaft 304 which is rotatable in a hole 302a. The drive shaft 304 is formed with a square hole 304a which fits on a square shaft 19a at the upper end portion of the shaft 19 of the bladder assembly 1. At the upper part of the drive shaft 304, a gear 304b and a gear 305, which meshes with the gear 304b and is driven by a rotation driving device 306, are provided.

The drive shaft 304 is rotated by the rotation driving device 306, by which the retaining claw 8a and the retaining claw 17a of the bladder assembly 1 are made in a connected state or in a disconnected state.

At the separation station UL, which is configured in this manner, the vulcanized tire T and the bladder assembly 1 are received, the upper part and the lower part of the bladder assembly 1 are disconnected from each other, the vulcanized tire T is separated from the bladder assembly 1, and the vulcanized tire T is unloaded, and also the expanded bladder B of the bladder assembly 1 is contracted for convenience of storage as shown in the right half of FIG. 15.

At this time, an appropriate pressurizing medium of a very low pressure can be sealed in the bladder B.

In FIG. 15, reference character ST denotes the whole storage station for the plurality of sets of bladder assemblies 1. This storage station has a pillar 400, a transverse beam 401 having a plurality of sets of rollers 402 on which the bottom surface of the base flange 4 of the bladder assembly 1 slides, an elevation guide 403 fixed to the side of the pillar 400, a bearing 404 sliding on the guide 403, a table 405 which is guided by the elevation guide 403 on the pillar 400 and is moved vertically by a driving unit (not shown), and rollers 406 for sliding.

Therefore, the table 405 is configured so that, after the lock claw 204 is released, it rises and takes the bladder assembly 1 onto the rollers 406, stops at a position of a shelf in which the bladder assembly 1 is to be stored, and then delivers the bladder assembly 1 into the storage shelf by driving the rollers 406 and 402 by means of a not illustrated driving unit. The interior of the storage shelf can be kept warm or heated to prevent the stored bladder assembly 1 from cooling.

The shaping station SH is disposed on the exit side of the storage station ST. It includes a table moving vertically on the exit side, a driving unit under the table, and the loader OP-Ag which holds a green tire GT and holds and loads the bladder assembly 1 to the mold opening/closing station OP. This configuration is the same as that of the separation station UL on the entrance side of the storage station ST. Therefore, the details thereof are omitted.

Next, the tire vulcanizing method in accordance with another embodiment of the present invention and the operation of the tire vulcanizing system in accordance with the third embodiment for carrying out the same method will be described.

Of the operations of the third embodiment, items (1) to (15) are the same as the items of the description of operation in the second embodiment.

(16) Thereafter, the tire mold assembly which stops at the vulcanizing station C12 is connected with an internal pressure supply device and an external pressure supply device, by which a heating/pressurizing medium is supplied and the vulcanization of tire is continued.

Also, the operation of the bladder assembly 1 of the third embodiment is as follows.

Items (1) to (8) of the third embodiment are the same as the items of the description of operation of the second embodiment.

(9) At an appropriate time, the unloader OP-Ah advances and lowers to hold the upper part of the bladder assembly on the lower mold, rises and swings to unload an assembly of the vulcanized tire T and the bladder assembly 1, by which the assembly is delivered onto a table outside the mold opening/closing device OP.

The operation at the table position will be described later in item (16) of the description of operation.

(10) Then, after the unloader OP-Ah retreats, the loader OP-Ag advances and lowers whild holding the assembly of the vulcanized tire T and the bladder assembly 1, delivers the assembly onto the lower mold and releases the assembly, and rises and retreats to the original position.

The operation for assembling the green tire GT and the bladder assembly 1 in advance will be described later in item (17) of the description of operation.

Items (11) to (15) are the same as the items of the description of operation in the second embodiment.

(16) The operation at the table position after the unloader OP-Ah unloads the vulcanized tire T and the bladder assembly 1 is as follows.

(a) The unloader OP-Ah unloads the vulcanized tire T and the bladder assembly 1 as a unit, and places the vulcanized tire T and the bladder assembly 1 on the table 201 moving vertically on the entrance side of the storage station ST for the bladder assembly 1.

(b) Then, the lower part of the bladder assembly 1 is fixed to the table 201. The unloader OP-Ah disconnects the upper part and the lower part of the bladder assembly 1 from each other, releases the bladder assembly 1, and rises for waiting.

(c) A bladder operating device under the table 201 rises, and extends the rod of the bladder assembly 1 to peel the bladder B off the vulcanized tire T.

(d) Then, the unloader OP-Ah having waited on the upside lowers, and holds the upper bead portion of the vulcanized tire T and rises to separate the vulcanized tire T from the bladder assembly 1.

(e) The unloader OP-Ah rises, retreats, and delivers the held vulcanized tire T to a discharge conveyor. This discharge conveyor conveys the vulcanized tire T to the next process.

(f) After the unloader OP-Ah retreats, the extended rod of the bladder assembly 1 is contracted and set at a height convenient for storage in the storage shelf. At this time, a pressurizing medium with atmospheric pressure or a pressure slightly higher than atmospheric pressure is sealed in the bladder B.

(g) Thereafter, the table 201 rises and stops by selecting the position of the shelf in which the bladder assembly 1 is to be stored.

(h) The bladder assembly 1 on the table 201 is released from the table 201, and is stored in the storage shelf.

(i) Thus, the vulcanized tire T and the bladder assembly 1, which have been unloaded by the unloader OP-Ah, are separated from each other at the table position. The bladder assembly 1 is stored in the selected storage shelf, transported to the exit side of the storage shelf in succession at an appropriate time, and waits in the storage shelf until the time of assembly with a green tire GT.

(17) The operation for assembling the green tire GT and the bladder assembly 1 in advance is as follows.

(a) At an appropriate time, the selected bladder assembly 1 is delivered from the storage shelf for the bladder assembly onto the table 201 which moves vertically on the exit side of the storage shelf.

Here, the appropriate time means a time near the time when the tire mold assembly M arrives at the position of the discharge station OP2 for the heating/pressurizing medium, in effect, a time when a preshaped assembly with the next green tire GT and the bladder assembly 1 can be supplied without trouble to the mold assembly M from which the vulcanized tire T has been removed.

(b) The delivered bladder assembly 1 is fixed to the table 201.

(c) A bladder operating device under the table 201 extends the rod of the bladder assembly 1. During this time, the loader OP-Ag for the green tire, which is provided in the vicinity of the table 201, holds the selected green tire GT and waits on the upside of the extended rod.

(d) After the extension of the rod is completed, the green tire GT is lowered and stops at a predetermined position. Then, the rod lowers, by which the bladder B is inserted in the green tire GT while expanding, and the shaping of the green tire GT is performed.

(e) After predetermined shaping work is finished, the loader OP-Ag connects the upper part and the lower part of the bladder assembly 1 to each other, releases the green tire GT, and rises and retreats.

(f) After the retreat, a loading device advances, lowers, and stops at a predetermined position, and then rises while holding the upper part of the bladder assembly 1, and waits until the time of item (10) of the description of operation.

The above is a description of the embodiments of the present invention. The present invention is not limited to the above-described embodiments, and various modifications and changes can be made on the basis of the technical concept of the present invention.

What is claimed is:

1. A tire vulcanizing system comprising a plurality of rows of tire vulcanizing stations which contain a plurality of sets of movable tire mold assemblies to vulcanize a tire; a mold opening/closing station which is disposed at said plurality of rows of tire vulcanizing stations to receive said tire mold assembly to open and close a tire mold, by which a vulcanized tire is removed and a green tire is inserted; a first mold transporting device and a second mold transporting device which are disposed between said mold opening/closing station and said plurality of rows of tire vulcanizing stations to transport said tire mold assembly; a discharge station which is disposed on a mold loading side of said mold opening/closing station to discharge a heating/pressurizing medium in a bladder assembly of said tire mold assembly having been transported from said plurality of rows of tire vulcanizing stations; and a supply station which is disposed on a mold unloading side of said mold opening/closing station to supply the heating/pressurizing medium into a heating chamber and the bladder assembly of said tire mold assembly, wherein said first mold transporting device is disposed on one side of said plurality of rows of tire vulcanizing stations and said second mold transporting device is disposed on the other side of said plurality of rows of tire vulcanizing stations, said plurality of rows of tire vulcanizing stations and said first mold transporting device are cooperative so that said tire mold assembly is carried out from one side of said plurality of rows of tire vulcanizing stations onto said first mold transporting device, said mold opening/closing station and said first mold transporting device are cooperative so that said tire mold assembly is transported to said mold opening/closing station by using said first mold transporting device, said mold opening/closing station and said second mold transporting device are cooperative so that said tire mold assembly is transferred from said mold opening/closing station onto said second mold transporting device, and said second mold transporting device and said plurality of rows of tire vulcanizing stations are cooperative so that said tire mold assembly is transported to the other side of said plurality of rows of tire vulcanizing stations by using said second mold transporting device, and is carried onto said plurality of rows of tire vulcanizing stations.

2. A tire vulcanization system according to claim 1, wherein said mold loading and mold unloading sides of said mold opening/closing station are diametrically opposed from one another.

3. The tire vulcanizing system according to claim 1, wherein said plurality of rows of tire vulcanizing stations further includes opposite third and fourth sides, said mold opening/closing station is proximate said third side of said plurality of rows of tire vulcanizing stations, and a mold changing device and a mold preheating device are proximate said fourth side of said plurality of rows of tire vulcanizing stations.

4. A tire vulcanizing system according to claim 1, further comprising:
a bladder assembly comprising an outer shaft to which a holding member for holding one end of a bladder is fixed; an inner shaft to which a holding member for holding the other end of said bladder is fixed, and which is inserted so as to be slidable in the axial direction with respect to the outer shaft; and rotating means, in which a retaining claw is formed at one end of said outer shaft, and a clawed flange having a claw which engages with or passes through the retaining claw of said outer shaft in accordance with the rotational angle is rotatably assembled to said inner shaft, for rotating said clawed flange from one end of said inner shaft, and by the engagement of the retaining claw of said outer shaft with the claw of said clawed flange, the vulcanized tire or the green tire and said bladder assembly are integrated for the insertion into and removal from said tire mold.

5. A tire vulcanizing system according to claim 1, further comprising:
a vulcanized tire removal and green tire supply device comprising a separation station which receives an assembly in which the vulcanized tire and a bladder assembly are integrated, and separates the vulcanized tire and the bladder assembly from each other; a storage station which stores the plurality of bladder assemblies from which the vulcanized tire has been separated; and a shaping station which receives the bladder assembly delivered from said storage station, inserts a bladder in the green tire and performs shaping, and integrates the green tire and the bladder assembly with each other.

6. A tire vulcanization system, comprising:
a plurality of rows of tire vulcanizing stations which contain a plurality of movable tire mold assemblies for vulcanizing tires, wherein said plurality of rows of tire vulcanizing stations includes opposite first and second sides;
a mold opening/closing station proximate said plurality of rows of tire vulcanizing stations for respectively receiving each of said tire mold assemblies, wherein for each of said tire mold assemblies, said mold opening/closing station is operative for receiving said tire mold assembly, opening said tire mold assembly, removing a vulcanized tire from said tire mold assembly, inserting a green tire into said tire mold assembly, and closing said tire mold assembly; and
first and second mold transporting devices for moving said tire mold assemblies, wherein said first mold transporting device is disposed proximate said first side of said plurality of rows of tire vulcanizing stations, and said second mold transporting device is disposed proximate said second side of said plurality of rows of tire vulcanizing stations such that said plurality of rows of tire vulcanizing stations is positioned between said first and second mold transporting devices, and wherein:
said first mold transporting device and said mold opening/closing station are cooperative so that said tire mold assemblies are moved in a single file arrangement along an upstream portion of a single file path from said first mold transporting device to a mold loading side of said mold opening/closing station,
said second mold transporting device and said mold opening/closing station are cooperative so that said tire mold assemblies are moved in a single file arrangement along a downstream portion of said single file path from a mold unloading side of said mold opening/closing station to said second mold transporting device, such that in said single file path said mold loading side of said mold opening/closing station is upstream from said mold unloading side of said mold opening/closing station,
said second mold transporting device and said plurality of rows of tire vulcanizing stations are cooperative so that said tire mold assemblies are moved respectively along separate upstream portions of a plurality of travel paths from said second mold transporting device to each of said plurality of rows of tire vulcanizing stations, such that said downstream portion of said single file path diverges into said upstream portions of said plurality of travel paths, and said first mold transporting device and said plurality of rows of tire vulcanizing stations are cooperative so that said tire mold assemblies are moved respectively along separate downstream portions of said plurality of travel paths from said plurality of rows of tire vulcanizing stations to said first mold transporting device, such that said downstream portions of said plurality of travel paths converge into said upstream portion of said single file travel path.

7. A tire vulcanizing system according to claim 6, further comprising a discharge station which is disposed on the mold loading side of said mold opening/closing station, wherein for each of said tire mold assemblies said discharge station is operative to discharge a heating/pressurizing medium in a bladder assembly of said tire mold assembly while said tire mold assembly is disposed at the mold loading side of said mold opening/closing station; and a supply station which is disposed on the mold unloading side of said mold opening/closing station, wherein for each of said tire mold assemblies said supply station is operative to supply the heating/pressurizing medium into a heating chamber and the bladder assembly of said tire mold assembly while said tire mold assembly is disposed at the mold unloading side of said mold opening/closing station.

8. The tire vulcanizing system according to claim 6, wherein said plurality of rows of tire vulcanizing stations further includes opposite third and fourth sides, said mold opening/closing station is proximate said third side of said plurality of rows of tire vulcanizing stations, and a mold changing device and a mold preheating device are proximate said fourth side of said plurality of rows of tire vulcanizing stations.

9. A tire vulcanizing system according to claim 6, further comprising:

a bladder assembly comprising an outer shaft to which a holding member for holding one end of a bladder is fixed; an inner shaft to which a holding member for holding the other end of said bladder is fixed, and which is inserted so as to be slidable in the axial direction with respect to the outer shaft; and rotating means, in which a retaining claw is formed at one end of said outer shaft, and a clawed flange having a claw which engages with or passes through the retaining claw of said outer shaft in accordance with the rotational angle is rotatably assembled to said inner shaft, for rotating said clawed flange from one end of said inner shaft, and by the engagement of the retaining claw of said outer shaft with the claw of said clawed flange, the vulcanized tire or the green tire and said bladder assembly are integrated for the insertion into and removal from said tire mold.

10. A tire vulcanizing system according to claim 6, further comprising:

a vulcanized tire removal and green tire supply device comprising a separation station which receives an assembly in which the vulcanized tire and a bladder assembly are integrated, and separates the vulcanized tire and the bladder assembly from each other; a storage station which stores the plurality of bladder assemblies from which the vulcanized tire has been separated; and a shaping station which receives the bladder assembly delivered from said storage station, inserts a bladder in the green tire and performs shaping, and integrates the green tire and the bladder assembly with each other.

11. A tire vulcanization system according to claim 6, wherein said mold loading and mold unloading sides of said mold opening/closing station are diametrically opposed from one another.

12. The tire vulcanizing system according to claim 11, wherein said plurality of rows of tire vulcanizing stations further includes opposite third and fourth sides, said mold opening/closing station is proximate said third side of said plurality of rows of tire vulcanizing stations, and a mold changing device and a mold preheating device are proximate said fourth side of said plurality of rows of tire vulcanizing stations.

13. A tire vulcanizing system according to claim 11, further comprising a discharge station which is disposed on said mold loading side of said mold opening/closing station, wherein for each of said tire mold assemblies said discharge station is operative to discharge a heating/pressurizing medium in a bladder assembly of said tire mold assembly while said tire mold assembly is disposed at said mold loading side of said mold opening/closing station; and a supply station which is disposed on said mold unloading side of said mold opening/closing station, wherein for each of said tire mold assemblies said supply station is operative to supply the heating/pressurizing medium into a heating chamber and the bladder assembly of said tire mold assembly while said tire mold assembly is disposed at said mold unloading side of said mold opening/closing station.

14. The tire vulcanizing system according to claim 13, wherein said plurality of rows of tire vulcanizing stations further includes opposite third and fourth sides, said mold opening/closing station is proximate said third side of said plurality of rows of tire vulcanizing stations, and a mold changing device and a mold preheating device are proximate said fourth side of said plurality of rows of tire vulcanizing stations.

15. A tire vulcanizing system according to claim 14, further comprising:

a bladder assembly comprising an outer shaft to which a holding member for holding one end of a bladder is fixed; an inner shaft to which a holding member for holding the other end of said bladder is fixed, and which is inserted so as to be slidable in the axial direction with respect to the outer shaft; and rotating means, in which a retaining claw is formed at one end of said outer shaft, and a clawed flange having a claw which engages with or passes through the retaining claw of said outer shaft in accordance with the rotational angle is rotatably assembled to said inner shaft, for rotating said clawed flange from one end of said inner shaft, and by the engagement of the retaining claw of said outer shaft with the claw of said clawed flange, the vulcanized tire or the green tire and said bladder assembly are integrated for the insertion into and removal from said tire mold.

16. A tire vulcanizing system according to claim 14, further comprising:

a vulcanized tire removal and green tire supply device comprising a separation station which receives an assembly in which the vulcanized tire and a bladder assembly are integrated, and separates the vulcanized tire and the bladder assembly from each other; a storage station which stores the plurality of bladder assemblies from which the vulcanized tire has been separated; and a shaping station which receives the bladder assembly delivered from said storage station, inserts a bladder in the green tire and performs shaping, and integrates the green tire and the bladder assembly with each other.

* * * * *